United States Patent
Jung et al.

(10) Patent No.: US 10,856,320 B2
(45) Date of Patent: Dec. 1, 2020

(54) CONFIGURING FOR BANDWIDTH PARTS

(71) Applicant: Lenovo (Singapore) PTE. LTD., New Tech Park (SG)

(72) Inventors: Hyejung Jung, Northbrook, IL (US); Prateek Basu Mallick, Dreieich (DE); Joachim Loehr, Wiesbaden (DE); Ravi Kuchibhotla, Clarendon Hills, IL (US); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 45 days.

(21) Appl. No.: 16/378,127

(22) Filed: Apr. 8, 2019

(65) Prior Publication Data
US 2019/0313437 A1  Oct. 10, 2019

Related U.S. Application Data

(60) Provisional application No. 62/654,110, filed on Apr. 6, 2018.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0042* (2013.01); *H04L 5/0053* (2013.01);
(Continued)

(58) Field of Classification Search
CPC ......... H04W 72/1289; H04W 72/1273; H04W 72/0453; H04W 74/006; H04W 74/0841;
(Continued)

(56) References Cited

U.S. PATENT DOCUMENTS

2018/0332505 A1* 11/2018 Kim .................. H04L 5/0053
2019/0342907 A1* 11/2019 Huang ............... H04L 5/0048
(Continued)

OTHER PUBLICATIONS

PCT/IB2019/000405, "Notification of Transmittal of the International Search Report and the Written Opinion of the International Searching Authority, or the Declaration", dated Oct. 18, 2019, pp. 1-24.
(Continued)

*Primary Examiner* — Kevin D Mew
(74) *Attorney, Agent, or Firm* — Kunzler Bean & Adamson

(57) ABSTRACT

Apparatuses, methods, and systems are disclosed for configuring bandwidth parts. One method includes: receiving a first bandwidth part configuration for a first downlink bandwidth part and a second bandwidth part configuration for a second downlink bandwidth part; receiving an indication to receive downlink signals and channels in the first downlink bandwidth part; identifying a control resource set and a corresponding search space for a type of physical downlink control channel common search space within a bandwidth of the first downlink bandwidth part from the second bandwidth part configuration; monitoring physical downlink control channel candidates on the control resource set; and receiving a physical downlink control channel on the control resource set, wherein the physical downlink control channel includes downlink control information associated with the type of physical downlink control channel common search space.

20 Claims, 7 Drawing Sheets

(51) Int. Cl.
*H04W 72/04* (2009.01)
*H04W 74/00* (2009.01)
*H04W 74/08* (2009.01)
*H04L 27/26* (2006.01)

(52) U.S. Cl.
CPC ....... *H04L 5/0091* (2013.01); *H04W 72/0453* (2013.01); *H04W 72/1273* (2013.01); *H04W 74/006* (2013.01); *H04W 74/0841* (2013.01); *H04L 27/2607* (2013.01)

(58) Field of Classification Search
CPC .. H04L 5/0042; H04L 5/0053; H04L 27/2607
See application file for complete search history.

(56) References Cited

U.S. PATENT DOCUMENTS

| | | | |
|---|---|---|---|
| 2019/0349180 A1* | 11/2019 | Lu | H04W 72/0446 |
| 2020/0100170 A1* | 3/2020 | Babaei | H04W 48/16 |
| 2020/0100311 A1* | 3/2020 | Cirik | H04W 72/042 |
| 2020/0145156 A1* | 5/2020 | Chen | H04L 5/0044 |
| 2020/0145169 A1* | 5/2020 | Zhou | H04B 1/713 |

OTHER PUBLICATIONS

Mediatek Inc., "BWP ambiguilty for contention-based RACH procedure", 3GPP TSG-RAN WG2 Meeting #101 R2-1803061, Feb. 26-Mar. 2, 2018, pp. 1-3.

Ericsson (Rapporteur), "E-mail discussion 101#68—BWP linkage", 3GPP TSG-RAN WG2 #101Bis Tdoc R2-1805416, Apr. 16-20, 2018, pp. 1-16.

Nokia et al., "Summary of Remaining Details on RACH Procedure", 3GPP TSG-RAN WG1#NR1801 R1-1801274, Jan. 22-26, 2018, pp. 1-53.

3GPP, "3rd Generation Partnership Project; Technical Specification Group Radio Access Network; NR; Medium Access Control (MAC) protocol specification (Release 15)", 3GPP TS 38.321 V15.1.0, Mar. 2018, pp. 1-67.

3GPP, "3rd Generation Partnership Project; Technical Specification Group Radio Access Network; NR; Physical layer procedures for control (Release 15)", 3GPP TS 38.213 V15.0.0, Dec. 2017, pp. 1-56.

3GPP, "3rd Generation Partnership Project; Technical Specification Group Radio Access Network NR Radio Resource Control (RRC) protocol specification (Release 15)", 3GPP TS 38.331 V15.0.0, Dec. 2017, pp. 1-188.

Panasonic, "DCI size alignment in CSS", 3GPP TSG RAN WG1 Meeting #92 R1-1802506, Feb. 26-Mar. 2, 2018, pp. 1-4.

PCT/IB2019/000405, Invitation to Pay Additional Fees and, Where Applicable, Protest Fee, Jul. 15, 2019, pp. 1-15.

Ericsson, "On Configuration of Control Resource Sets", 3GPP TSG-RAN WG1 Meeting #90 R1-1714410, Aug. 21-25, 2017, pp. 1-7.

Nokia et al., "On NR operation under PDCCH channel estimation and BD limits", 3GPP TSG RAN WG1 Ad Hoc #92 R1-1802537, Feb. 26-Mar. 2, 2018, pp. 1-11.

Intel Corporation, "Paging and Broadcast Information Handling in NR SA for RRC Connected state UE", 3GPP TSG-RAN WG2 Meeting #101 R2-1802979, Feb. 26-Mar. 2, 2018, pp. 1-5.

* cited by examiner

CONFIGURING FOR BANDWIDTH PARTS

CROSS-REFERENCE TO RELATED APPLICATIONS

This application claims priority to U.S. Patent Application Ser. No. 62/654,110 entitled "METHODS FOR BANDWIDTH PART BASED COMMUNICATIONS" and filed on Apr. 6, 2018 for Hyejung Jung, which is incorporated herein by reference in its entirety.

FIELD

The subject matter disclosed herein relates generally to wireless communications and more particularly relates to configuring bandwidth parts.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Commercial Mobile Alert Service ("CMAS"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), Power Angular Spectrum ("PAS"), Physical Broadcast Channel ("PBCH"), Power Control ("PC"), LTE-to-V2X Interface ("PC5"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information ("SI"), System Information Block ("SIB"), SystemInformation-BlockType1 ("SIB1"), SystemInformationBlockType2

("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Indicator ("TAI"), Transport Block ("TB"), Transport Block Size ("TBS"), Time-Division Duplex ("TDD"), Time Domain Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, BWP communications may be used. In such networks, a UE may change a BWP that is used.

BRIEF SUMMARY

Methods for configuring bandwidth parts are disclosed. Apparatuses and systems also perform the functions of the apparatus. One embodiment of a method includes receiving a first bandwidth part configuration for a first downlink bandwidth part and a second bandwidth part configuration for a second downlink bandwidth part. In certain embodiments, the method includes receiving an indication to receive downlink signals and channels in the first downlink bandwidth part. In various embodiments, the method includes identifying a control resource set and a corresponding search space for a type of physical downlink control channel common search space within a bandwidth of the first downlink bandwidth part from the second bandwidth part configuration. In some embodiments, the method includes monitoring physical downlink control channel candidates on the control resource set according to the corresponding search space in the first downlink bandwidth part. In certain embodiments, the method includes receiving a physical downlink control channel on the control resource set according to the corresponding search space in the first downlink bandwidth part. In such embodiments, the physical downlink control channel includes downlink control information associated with the type of physical downlink control channel common search space.

One apparatus for configuring bandwidth parts includes a receiver that: receives a first bandwidth part configuration for a first downlink bandwidth part and a second bandwidth part configuration for a second downlink bandwidth part; and receives an indication to receive downlink signals and channels in the first downlink bandwidth part. In some embodiments, the apparatus includes a processor that: identifies a control resource set and a corresponding search space for a type of physical downlink control channel common search space within a bandwidth of the first downlink bandwidth part from the second bandwidth part configuration; and monitors physical downlink control channel candidates on the control resource set according to the corresponding search space in the first downlink bandwidth part. In certain embodiments, the receiver receives a physical downlink control channel on the control resource set according to the corresponding search space in the first downlink bandwidth part, and the physical downlink control channel includes downlink control information associated with the type of physical downlink control channel common search space.

One method for configuring bandwidth parts includes selecting a random access channel configuration from a plurality of random access channel configurations indicated in a plurality of bandwidth part configurations. In various embodiments, the method includes receiving an indication of association between the random access channel configuration, a control resource set, and a corresponding search space of a downlink carrier of a cell for a type of physical downlink control channel common search space. In such embodiments, the type of physical downlink control channel common search space is a common search space for reception of a random access response message and a contention resolution message. In certain embodiments, the method includes determining the association between the random access channel configuration, the control resource set, and the corresponding search space based on the indication. In some embodiments, the method includes switching to a new active downlink bandwidth part. In such embodiments, the new active downlink bandwidth part is configured with the control resource set and the corresponding search space associated with the random access channel configuration.

One apparatus for configuring bandwidth parts includes a processor that selects a random access channel configuration from a plurality of random access channel configurations indicated in a plurality of bandwidth part configurations. In some embodiments, the apparatus includes a receiver that receives an indication of association between the random access channel configuration, a control resource set, and a corresponding search space of a downlink carrier of a cell for a type of physical downlink control channel common search space, wherein the type of physical downlink control channel common search space is a common search space for reception of a random access response message and a contention resolution message. In certain embodiments, the processor: determines the association between the random access channel configuration, the control resource set, and the corresponding search space based on the indication; and switches to a new active downlink bandwidth part, and the new active downlink bandwidth part is configured with the control resource set and the corresponding search space associated with the random access channel configuration.

One method for configuring bandwidth parts includes receiving a plurality of bandwidth part configurations for a plurality of bandwidth parts in a cell including a first bandwidth part configuration for a first uplink bandwidth part and a second bandwidth part configuration for a second uplink bandwidth part. In certain embodiments, the method includes receiving an indication to transmit uplink signals and channels in the first uplink bandwidth part. In various embodiments, the method includes identifying at least one random access channel configuration within a bandwidth of the first uplink bandwidth part. In some embodiments, the method includes selecting a random access channel configuration from the at least one random access channel configuration. In certain embodiments, the method includes transmitting a random access channel preamble in the first uplink bandwidth part according to the random access channel configuration. In certain embodiments, the method includes receiving a physical downlink control channel from a common search space in a downlink bandwidth part. In such embodiments, the common search space in the downlink bandwidth part is associated with the random access channel configuration.

One apparatus for configuring bandwidth parts includes a receiver that: receives a plurality of bandwidth part configurations for a plurality of bandwidth parts in a cell including a first bandwidth part configuration for a first uplink bandwidth part and a second bandwidth part configuration for a second uplink bandwidth part; and receives an indication to transmit uplink signals and channels in the first uplink bandwidth part. In some embodiments, the apparatus includes a processor that: identifies at least one random access channel configuration within a bandwidth of the first uplink bandwidth part; and selects a random access channel configuration from the at least one random access channel configuration. In certain embodiments, the apparatus includes a transmitter that transmits a random access channel preamble in the first uplink bandwidth part according to the random access channel configuration. In various embodiments, the receiver receives a physical downlink control channel from a common search space in a downlink bandwidth part, and the common search space in the downlink bandwidth part is associated with the random access channel configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
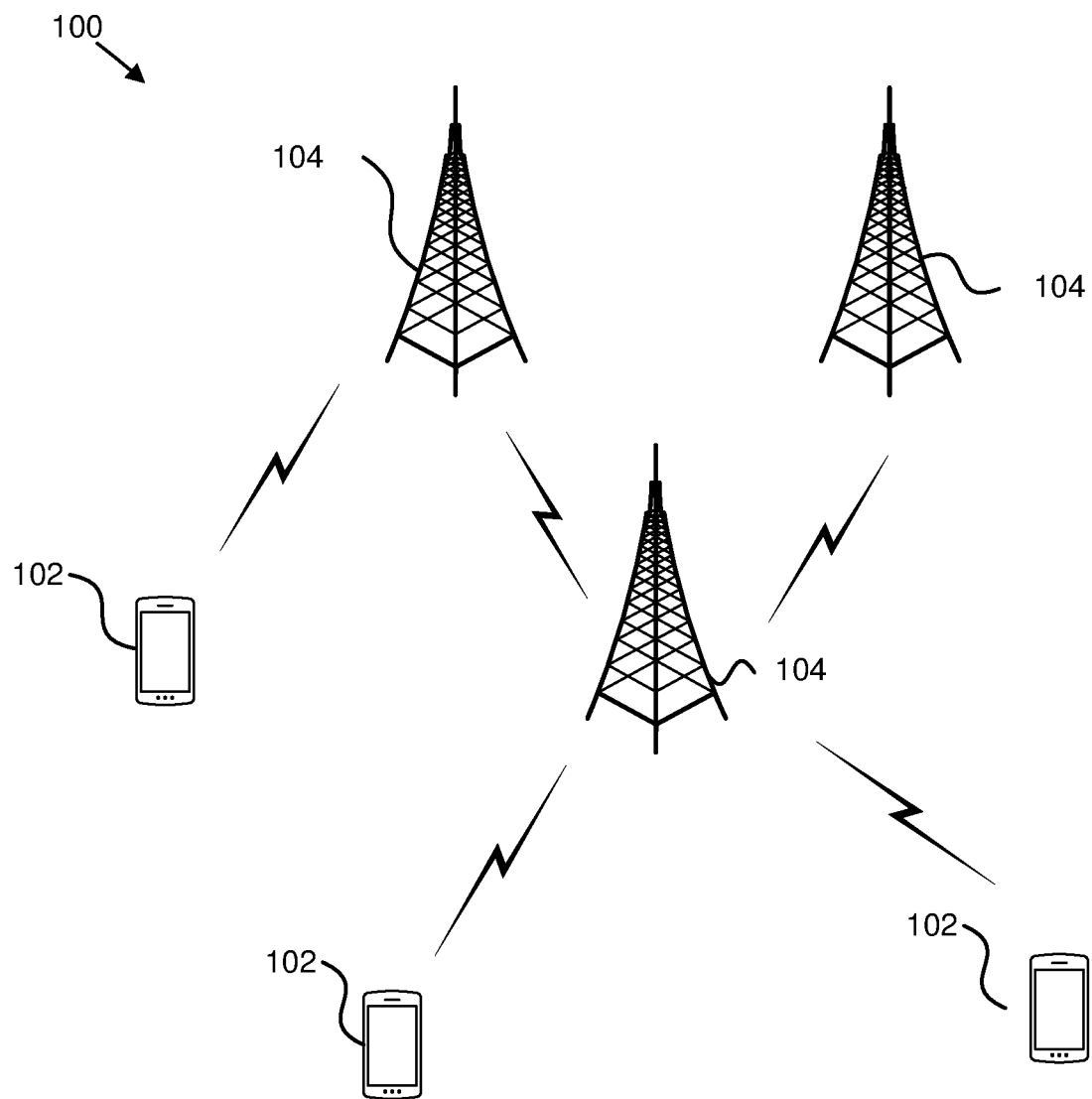
FIG. 1 is a schematic block diagram illustrating one embodiment of a wireless communication system for configuring bandwidth parts.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring bandwidth parts. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical headmounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a first bandwidth part configuration for a first downlink bandwidth part and a second bandwidth part configuration for a second downlink bandwidth part. In certain embodiments, the remote unit 102 may receive an indication to receive downlink signals and channels in the first downlink bandwidth part. In various embodiments, the remote unit 102 may identify a control resource set and a corresponding search space for a type of physical downlink control channel common search space within a bandwidth of the first downlink bandwidth part from the second bandwidth part configuration. In some embodiments, the remote unit 102 may monitor physical downlink control channel candidates on the control resource set according to the corresponding search space in the first downlink bandwidth part. In certain embodiments, the remote unit 102 may receive a physical downlink control channel on the control resource set according to the corresponding search space in the first downlink bandwidth part. In such embodiments, the physical downlink control channel includes downlink control information associated with the type of physical downlink control channel common search space. Accordingly, the remote unit 102 may be used for configuring bandwidth parts.

In certain embodiment, a remote unit 102 may select a random access channel configuration from a plurality of random access channel configurations indicated in a plurality of bandwidth part configurations. In various embodiments, the remote unit 102 may receive an indication of association between the random access channel configuration, a control resource set, and a corresponding search space of a downlink carrier of a cell for a type of physical downlink control channel common search space. In such embodiments, the type of physical downlink control channel common search space is a common search space for reception of a random access response message and a contention resolution message. In certain embodiments, the remote unit 102 may determine the association between the random access channel configuration, the control resource set, and the corresponding search space based on the indication. In some embodiments, the remote unit 102 may switch to a new active downlink bandwidth part. In such embodiments, the new active downlink bandwidth part is configured with the control resource set and the corresponding search space associated with the random access channel configuration. Accordingly, the remote unit 102 may be used for configuring bandwidth parts.

In various embodiment, a remote unit 102 may receive a plurality of bandwidth part configurations for a plurality of bandwidth parts in a cell including a first bandwidth part configuration for a first uplink bandwidth part and a second bandwidth part configuration for a second uplink bandwidth part. In certain embodiments, the remote unit 102 may receive an indication to transmit uplink signals and channels in the first uplink bandwidth part. In various embodiments, the remote unit 102 may identify at least one random access channel configuration within a bandwidth of the first uplink bandwidth part. In some embodiments, the remote unit 102 may select a random access channel configuration from the at least one random access channel configuration. In certain embodiments, the remote unit 102 may transmit a random access channel preamble in the first uplink bandwidth part according to the random access channel configuration. In certain embodiments, the remote unit 102 may receive a physical downlink control channel from a common search space in a downlink bandwidth part. In such embodiments, the common search space in the downlink bandwidth part is associated with the random access channel configuration. Accordingly, the remote unit 102 may be used for configuring bandwidth parts.

Figure 2:
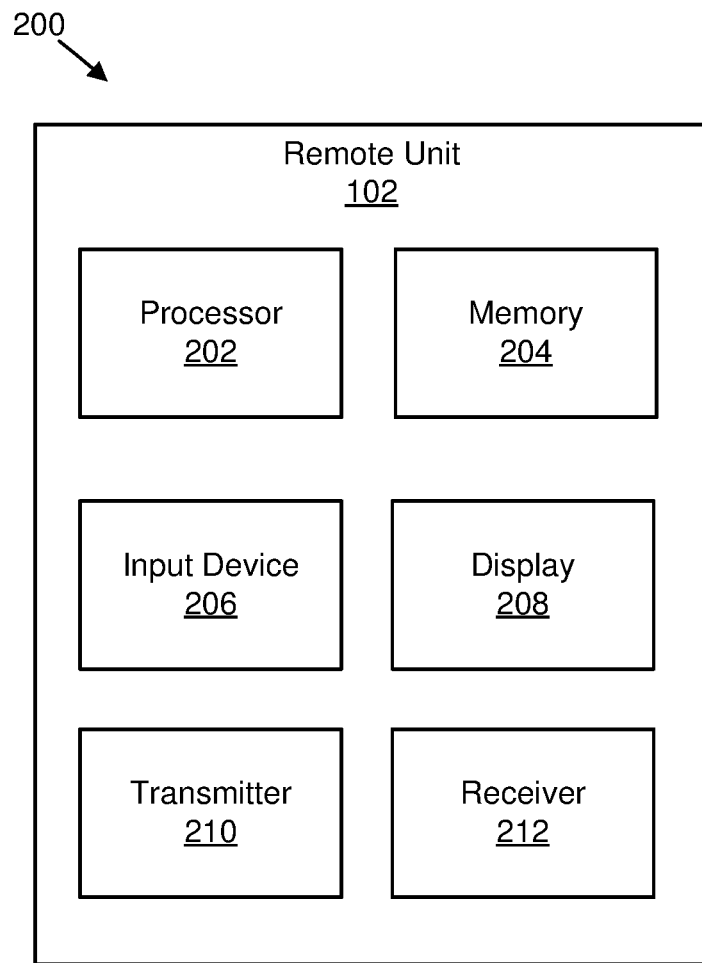
FIG. 2 is a schematic block diagram illustrating one embodiment of an apparatus that may be used for configuring bandwidth parts.

FIG. 2 depicts one embodiment of an apparatus 200 that may be used for configuring bandwidth parts. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: identify a control resource set and a corresponding search space for a type of physical downlink control channel common search space within a bandwidth of the first downlink bandwidth part from the second bandwidth part configuration; and monitor physical downlink control channel candidates on the control resource set according to the corresponding search space in the first downlink bandwidth part. In certain embodiments, the processor 202 may: select a random access channel configuration from a plurality of random access channel configurations indicated in a plurality of bandwidth part configurations; determine the association between the random access channel configuration, the control resource set, and the corresponding search space based on the indication; and switch to a new active downlink bandwidth part, and the new active downlink bandwidth part is configured with the control resource set and the corresponding search space associated with the random access channel configuration. In some embodiments, the processor 202 may: identify at least one random access channel configuration within a bandwidth of the first uplink bandwidth part; and select a random access channel configuration from the at least one random access channel configuration. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In certain embodiments, the receiver 212: receives a first bandwidth part configuration for a first downlink bandwidth part and a second bandwidth part configuration for a second downlink bandwidth part; receives an indication to receive downlink signals and channels in the first downlink bandwidth part; and receives a physical downlink control channel on the control resource set according to the corresponding search space in the first downlink bandwidth part, wherein the physical downlink control channel includes downlink control information associated with the type of physical downlink control channel common search space.

In various embodiments, the receiver 212 receives an indication of association between the random access channel configuration, a control resource set, and a corresponding search space of a downlink carrier of a cell for a type of physical downlink control channel common search space, wherein the type of physical downlink control channel common search space is a common search space for reception of a random access response message and a contention resolution message.

In some embodiments, the receiver 212: receives a plurality of bandwidth part configurations for a plurality of bandwidth parts in a cell including a first bandwidth part configuration for a first uplink bandwidth part and a second bandwidth part configuration for a second uplink bandwidth part; and receives an indication to transmit uplink signals and channels in the first uplink bandwidth part. In certain embodiments, the transmitter 210 transmits a random access channel preamble in the first uplink bandwidth part according to the random access channel configuration. In various embodiments, the receiver 212 receives a physical downlink control channel from a common search space in a downlink bandwidth part, and the common search space in the downlink bandwidth part is associated with the random access channel configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
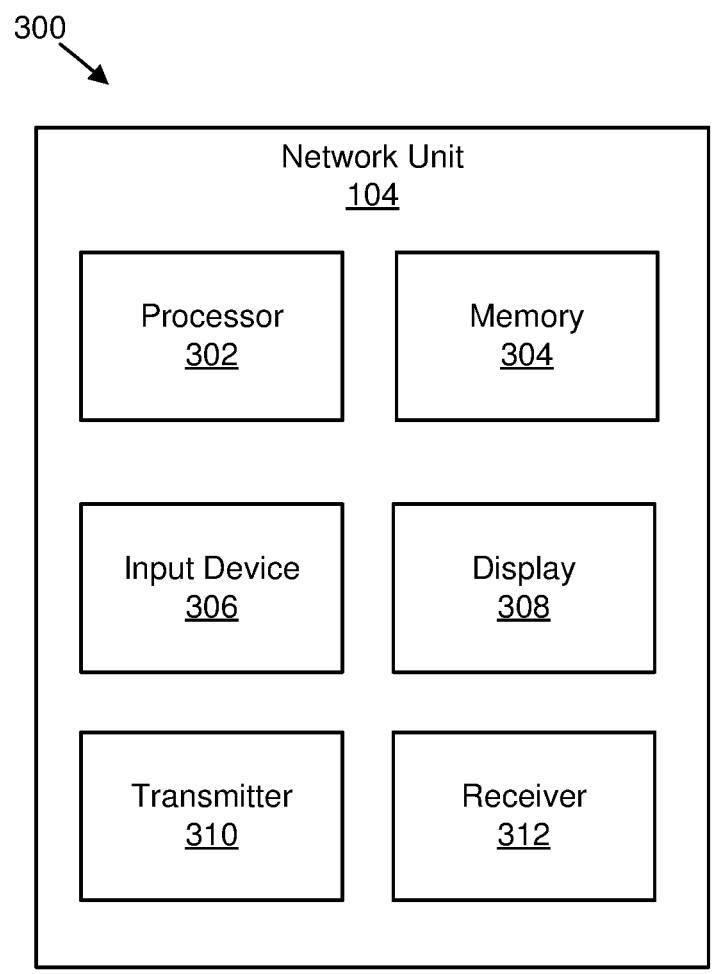
FIG. 3 is a schematic block diagram illustrating one embodiment of an apparatus that may be used for configuring bandwidth parts.

FIG. 3 depicts one embodiment of an apparatus 300 that may be used for configuring bandwidth parts. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 transmits configuration information for configuring bandwidth parts. In certain embodiments, the transmitter 310: transmits a first bandwidth part configuration for a first downlink bandwidth part and a second bandwidth part configuration for a second downlink bandwidth part to a remote unit; transmits an indication to receive downlink signals and channels in the first downlink bandwidth part to the remote unit, wherein the remote unit: identifies a control resource set and a corresponding search space for a type of physical downlink control channel common search space within a bandwidth of the first downlink bandwidth part from the second bandwidth part configuration; and monitors physical downlink control channel candidates on the control resource set according to the corresponding search space in the first downlink bandwidth part; and transmits a physical downlink control channel on the control resource set to the remote unit according to the corresponding search space in the first downlink bandwidth part, wherein the physical downlink control channel includes downlink control information associated with the type of physical downlink control channel common search space. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various configurations, such as in 5G NR, a system may operate in higher frequency bands than in LTE (e.g. above 6 GHz). In such high frequency bands, a carrier bandwidth may be up to 400 MHz (or wider), and each carrier may include on or more non-contiguous spectrum chunks. In some configurations, because (i) a UE channel bandwidth may be smaller than a carrier bandwidth, (ii) a non-contiguous spectrum may be used for one carrier, and (iii) multiple numerologies may be configured within one carrier, BWP based operation may be used, such as in 5G NR. Each BWP may include a group of contiguous PRBs and may be associated with a certain subcarrier spacing and a cyclic prefix length.

In various configurations, in BWP operation, a UE may be configured with one or more DL BWPs used for DL reception, and one or more UL BWPs used for UL transmission. In some configurations, an initial DL BWP of a cell corresponds to PRBs allocated as a CORESET for a SIM search space. In certain configurations, an initial UL BWP of a cell may be defined as an UL BWP in which a UE performs a random access procedure for initial uplink synchronization with the cell. In various configurations, an active DL BWP for a UE is a DL BWP in which a UE monitors PDCCH candidates, and an active UL BWP for the UE is an UL BWP in which the UE performs UL transmissions such as PUCCH, PUSCH, SRS, and/or PRACH. In some configurations, an active DL BWP and/or an active UL BWP may dynamically change based on a BWP indicator field in DCI. In certain configurations, if a BWP inactivity timer is configured for a UE, the UE switches to a default DL BWP if configured or to an initial DL BWP upon expiry of the BWP inactivity timer.

In various configurations, each DL BWP configuration for a UE may include one or more CSS configurations such as a Type0-PDCCH CSS (e.g., SIB1 search space) for a DCI format with a CRC scrambled by an SI-RNTI on a PCell; a Type0A-PDCCH CSS for a DCI format with a CRC scrambled by an SI-RNTI on a PCell; a Type1-PDCCH CSS for a DCI format with a CRC scrambled by an RA-RNTI, a TC-RNTI, or a C-RNTI on a PCell or on a SCell in which the UE may transmit PRACH; and a Type2-PDCCH CSS for a DCI format with a CRC scrambled by a P-RNTI on a PCell. In such configurations, a CORESET for Type0A-PDCCH CSS and/or Type2-PDCCH CSS is the same as a CORESET for Type0-PDCCH CSS, and a CORESET for Type1-PDCCH CSS is the same as the CORESET for Type0-PDCCH CSS, if not separately indicated.

In some configurations, for a UE in an RRC CONNECTED state, if the UE's active DL BWP in a PCell is configured with a Type0-PDCCH CSS (and optionally Type0A-PDCCH CSS, Type1-PDCCH CSS, and/or Type2-PDCCH CSS), the UE may acquire broadcast SI of interest within the UE's active BWP. In certain configurations, a UE may receive a DCI format with a CRC scrambled by a P-RNTI, DCI for PDCCH-ordered random access procedure, DCI for a random access response (e.g., via Msg2), and DCI for contention resolution (e.g., via Msg4) in an active DL BWP of a PCell. In various configurations, if neither Type0-PDCCH CSS nor Type0A-PDCCH CSS is configured in an active DL BWP of a PCell, a network entity (e.g., gNB) may provide a UE with SI via dedicated signaling.

Described herein are various embodiments that may enable a UE to receive at least one of SI messages, a DCI format with a CRC scrambled by a P-RNTI, DCI for Msg2, and DCI for Msg4 with less configuration signaling overhead and/or low system overhead for SI delivery. Furthermore, various embodiments may include information related to dynamically changing radio resource configurations based on BWP operation and related UE behaviors.

In some configurations, each configured BWP may have a different RACH configuration and a different common search space configuration. In various configurations, a UE may be able to receive paging and SI from a non-active BWP that overlaps with an active BWP in frequency and provides paging and SI broadcast while staying in a UE's active BWP. As described herein, paging may refer to a DCI format that has a CRC scrambled by a P-RNTI received in a Type2-PDCCH CSS and includes an indication of SI modification, a CMAS indication, and/or an ETWS indication.

In certain configurations, such as for random access procedure, a linkage between a DL BWP and an UL BWP may be defined and/or configured to avoid confusion at a UE side and/or to avoid multiple Msg2 transmissions on multiple DL BWPs. For example, if two UL BWPs, each of which is configured with a different RACH configuration, are associated with one DL BWP configured with a Type1-PDCCH CSS, the UE may not be able to differentiate whether a preamble ID in a random access response message addresses a preamble sent on the UL BWP for which the UE sent PRACH or another preamble sent on another UL BWP by another UE. As may be appreciated, in some configurations RA-RNTI may be calculated as follows: $RA\text{-}RNTI = 1 + s\_id + 14*t\_id + 14*X*f\_id + 14*X*Y*ul\_carrier\_id$, where $s\_id$ may be an index of a first OFDM symbol of a specified PRACH ($0 \leq s\_id \leq 14$), $t\_id$ may be an index of a first slot of the specified PRACH in a system frame ($0 \leq t\_id \leq 80$), $f\_id$ may be an index of the specified PRACH in a frequency domain ($0 \leq f\_id \leq 8$), and $ul\_carrier\_id$ may be an ID corresponding to an UL carrier used for RACH preamble transmission. In such configurations, the $ul\_carrier\_id$ may be 0 for a normal carrier and 1 for a SUL carrier. Moreover, because f_id is a frequency-domain RACH occasion index within one RACH configuration, two different RACH occasions from two UL BWPs of the same UL carrier may have the same RA-RNTI.

In various configurations, if two DL BWPs are associated with one UL BWP for RACH in a system perspective, a gNB may transmit two random access response messages in two different DL BWPs. As may be appreciated, one-to-one mapping between a DL BWP and an UL BWP, which may be indicated via a pair of UL BWP ID and DL BWP ID or via one BWP ID applicable to both UL and DL BWPs, may not be enough to avoid these issues unless a certain restriction on RACH and Type1-PDCCH CSS configurations is made. For example, two overlapping UL BWPs may have the same RACH configuration and may include the same set of RACH resources while associated DL BWPs for each of the two overlapping UL BWPs may have different CORESETs for Type1-PDCCH CSS.

In some embodiments, a network entity may configure partially or fully overlapping (e.g., in a frequency domain) BWPs for a UE. In such embodiments, the partially or fully overlapping BWPs may have the same or different common and/or dedicated radio resource configurations such as PDCCH, PDSCH, RACH, PUSCH, and/or PUCCH configurations. In certain embodiments, because a network entity may change a UE's active DL BWP and/or UL BWP dynamically via DCI signaling, configuring overlapping BWPs with different radio resource configurations may enable fast switching of radio resource configuration based on BWP operation. In various embodiments, if only a part of radio resource configuration parameters need to be differently configured across different overlapping BWPs, it may be beneficial to reuse a part of configuration signaling from one DL BWP and/or UL BWP for another DL BWP and/or UL BWP.

In one embodiment, a UE receives one or more DL BWP configurations for one or more corresponding DL BWPs. If the UE receives an indication to operate in a first DL BWP from the one or more configured DL BWPs (e.g., the first DL BWP is indicated as an active DL BWP for the UE), the UE may identify whether there is at least one CORESET for at least one type of PDCCH CSS (e.g., Type0-PDCCH CSS, Type0A-PDCCH CSS, Type1-PDCCH CSS, and/or Type2-PDCCH CSS) within a bandwidth of the first DL BWP from the received one or more DL BWP configurations. If at least one CORESET is configured for at least one type of PDCCH CSS within the bandwidth of the first DL BWP, the UE may monitor a set of PDCCH candidates in the at least one type of PDCCH CSS and receives corresponding PDCCHs on the at least one CORESET within the first DL BWP. As may be appreciated, monitoring may include decoding each PDCCH candidate according to monitored DCI formats, such as DCI format 1_0 for scheduling SI, paging, and random access Msg2 and/or Msg4. For example, each received PDCCH on the at least one CORESET includes CRC scrambled by one of a SI-RNTI, a P-RNTI, a RA-RNTI, a TC-RNTI, or a C-RNTI.

If more than one CORESET and/or search space configurations for a given type of PDCCH CSS exists within the bandwidth of the first DL BWP (e.g., active DL BWP), the UE may prioritize and employ a CORESET and/or search space configuration of the current active BWP configuration (e.g., the first DL BWP configuration) over other CORESET and/or search space configurations for the same type of PDCCH CSS within the bandwidth of the first DL BWP. The other CORESET and/or search space configurations for the same type of PDCCH CSS within the bandwidth of the first DL BWP may be associated with a different BWP that has overlapping PRBs with the first DL BWP. Further, for the given type of PDCCH CSS, if the active DL BWP configuration does not include a CORESET and/or search space configuration, the UE may select a CORESET and/or search space configuration with numerology the same as the active DL BWP configuration among the other CORESET and/or search space configurations within the bandwidth of the active DL BWP. If there is no CORESET and/or search space configurations with a numerology the same as the active DL BWP configuration, the UE may select a CORESET and/or search space configuration with a smallest SCS. For example, if the active DL BWP is configured with 60 KHz SCS and CORESET and/or search space configurations of 30 KHz SCS and 15 KHz SCS exist within the bandwidth of the active DL BWP, the UE may select the CORESET and/or search space configuration of 15 KHz SCS. As may be appreciated, selecting the CORESET and/or search space configuration with the lowest SCS may be beneficial for reliable reception of PDCCH on the selected CORESET.

In certain embodiments, if there is no CORESET and/or search space configuration with a numerology the same as the active DL BWP configuration, the UE may select a CORESET and/or search space configuration with a largest SCS that is smaller than the SCS of the active DL BWP configuration. For example, if the active DL BWP is configured with 60 KHz SCS and CORESET and/or search space configurations of 30 KHz SCS and 15 KHz SCS exist within the bandwidth of the active DL BWP, the UE may select the CORESET and/or search space configuration of 30 KHz SCS. As may be appreciated, this may provide better PDCCH reception reliability than if a CORESET and/or search space configuration of the same PDCCH CSS type was configured in the 60 kHz SCS active DL BWP while providing minimum disruption during PDCCH CSS type monitoring occasions to other DL signals and/or channels (e.g., CSI-RS, PDSCH data reception) on the active DL BWP (e.g., 1 slot of 30 kHz SCS overlaps with 2 slots of 60 kHz SCS).

In various embodiments, if an association is defined or specified between a RACH configuration and RACH CORESET and/or search space configuration, and if the active DL BWP configuration does not include a RACH CORESET and/or search space configuration, the UE may select a RACH CORESET and/or search space configuration among other CORESET and/or search space configurations within the bandwidth of the active DL BWP for which a RACH configuration is included in the active UL BWP. In some embodiments, a UE may prioritize a RACH CORESET and/or search space configuration with the same numerology as the active DL BWP configuration if multiple RACH CORESET and/or search space configurations associated with RACH configurations are included in the active UL BWP. In embodiments in which there is no RACH CORESET and/or search space configuration with the same numerology as the active DL BWP configuration, the UE may select the RACH CORESET and/or search space configuration with a smallest SCS (or, in another alternative, with a largest SCS that is smaller than the SCS of the active DL BWP configuration) which has an associated RACH configurations included in the active UL BWP. If any of the one or more DL BWP configurations does not include any CORESET for at least one type of PDCCH CSS within the bandwidth of the first DL BWP, then the UE may receive broadcast SI (e.g., CMAS-Indication, ETWS-Indication, and/or SystemInformationBlockTypeX) via dedicated signaling.

In certain embodiments, upon initiation of a random access procedure, the UE may switch from the first DL BWP to a new active DL BWP which includes a CORESET for Type1-PDCCH CSS to receive RAR and/or contention resolution messages. The new active DL BWP which includes a CORESET for Type1-PDCCH CSS may be determined based on selection of a RACH configuration and a corresponding UL BWP, and may assume that there is a one-to-one mapping between a Type1-PDCCH CSS and a RACH configuration. As may be appreciated, a UE may use any suitable combination of the above mentioned prioritization and/or selection criteria to select a CORESET and/or search space configuration for a given type of PDCCH CSS.

In various embodiments, a first DL BWP configuration associated with a first DL BWP includes at least one CORESET for at least one type of PDCCH CSS. In some embodiments, a first DL BWP configuration associated with a first DL BWP includes a first CORESET for one or more types of PDCCH CSS, and a second DL BWP configuration associated with a second DL BWP from one or more configured DL BWPs includes a second CORESET for one or more types of PDCCH CSS. In such embodiments, the first and second CORESETs may be within the bandwidth of the first DL BWP. Furthermore, in certain embodiments a first DL BWP and a second DL BWP have overlapping PRBs with at least a second CORESET PRBs located in the overlap region. In such embodiments, the UE having the first DL BWP as an active DL BWP monitors one or more types of PDCCH CSS associated with a first CORESET.

In some embodiments, while a first DL BWP configuration associated with a first DL BWP does not include any CORESET for any type of PDCCH CSS, a second DL BWP configuration associated with a second DL BWP includes at least one CORESET for at least one type of PDCCH CSS. In such embodiments, the first and second DL BWPs partially or fully overlap in frequency and the at least one CORESET is within an overlapped bandwidth of the first and second DL BWPs. If the first and second DL BWPs are configured with the same numerology (e.g., subcarrier spacing and cyclic prefix length), the UE may receive PDCCHs from the at least one type of PDCCH CSS and other DL signals and/or channels of the first DL BWP simultaneously. If the first and second DL BWPs are configured with different numerologies, the UE may or may not receive PDCCHs from the at least one type of PDCCH CSS and other DL signals and/or channels of the first DL BWP simultaneously, depending on UE capability of simultaneous operation of multiple numerologies. If the UE is not capable of simultaneous reception of signals and/or channels of different numerologies, and if the at least one CORESET within the bandwidth of the first DL BWP has a numerology different from the numerology of the first DL BWP, then the UE may not monitor the at least one type of PDCCH CSS. Instead, the UE may receive SI via dedicated signaling and may switch to a different DL BWP for random access procedure. In various embodiments, a UE may assume that there are no other signals and/or channels which need to be received by the UE during monitoring occasions of at least one type of PDCCH CSS. As may be appreciated, because a network entity may receive UE capability information for a connected UE, there may be no ambiguity between the UE and the network entity regarding delivery of SI, Msg2, and Msg4 PDCCH (e.g., PDCCH for contention resolution).

In certain embodiments described herein, if at least one CORESET for at least one type of PDCCH CSS is within both a bandwidth of a first DL BWP and a bandwidth of a second DL BWP, a network entity can include an indication of the at least one CORESET for the at least one type of PDCCH CSS in either the first or second DL BWP configuration instead of duplicating the at least one CORESET and at least one search space configuration in multiple DL BWP configurations. Accordingly, the UE may use the at least one CORESET for the at least one type of PDCCH CSS in the first and second DL BWPs.

In some embodiments, a UE may prioritize reception of signals and/or channels with explicit configuration in a DL BWP configuration of an active DL BWP if a number of RX spatial filters the UE can apply at a given time is limited. For example, if at least one CORESET for at least one type of PDCCH CSS that is within a bandwidth of the active DL BWP but indicated via a DL BWP configuration of a non-active DL BPW overlaps in time with a spatially (e.g., in terms of spatial RX parameters) non-QCLed UE-specific CORESET or UE-specific PDSCH of the active DL BWP, and if the UE can apply only one RX spatial filter at a given time, the UE may skip monitoring occasions of the at least one type of PDCCH CSS. If the at least one CORESET for the at least one type of PDCCH CSS is indicated via the DL BWP configuration of the active DL BWP, the UE may prioritize reception of PDCCHs associated with the at least one type of PDCCH CSS over monitoring the UE-specific CORESET and/or reception of UE-specific PDSCH during at least the overlap period if the spatial RX filter that is needed for the UE-specific CORESET and/or reception of UE-specific PDSCH, and the at least one CORESET reception are different and the UE is not capable of applying more than one spatial RX filter at a given time instance. If the UE can apply two or more RX spatial filters simultaneously (e.g., equipped with two or more RF chains at a UE receiver) and/or if the at least one CORESET of the at least one type of PDCCH CSS is QCLed with the UE-specific CORESET or UE-specific PDSCH at a given time in terms of spatial RX parameters, the UE may simultaneously receive a PDCCH from the at least one type of PDCCH CSS and the UE-specific PDCCH (or PDSCH).

In certain embodiments, during initial cell selection and/or handover, a UE may perform a random access procedure in initial DL and UL BWPs. In such embodiments, configuration of the initial DL BWP may be included in either a MIB or in dedicated higher layer signaling, and configuration of the initial UL BWP may be included in either SIB1 or dedicated higher layer signaling.

Figure 4:
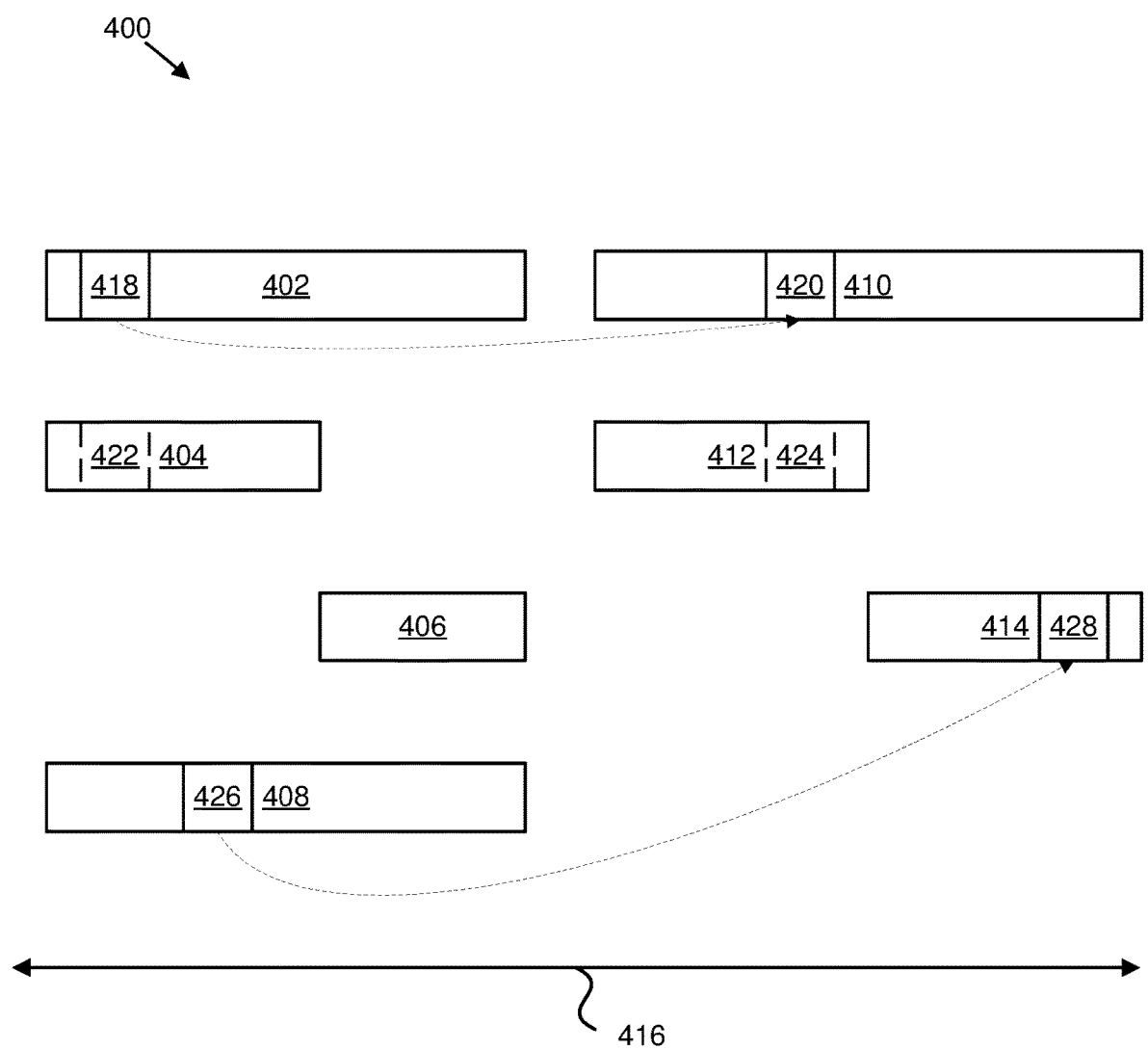
FIG. 4 is a schematic block diagram illustrating one embodiment of paired BWP configurations.

In one embodiment, a network entity may configure a given RACH configuration in a given UL carrier of a cell to be associated with a distinctive Type1-PDCCH CSS (e.g., a CSS for reception of Msg2 and Msg4) of a given DL carrier of the cell. In such an embodiment, the given RACH configuration includes a set of RACH resources and the Type1-PDCCH CSS includes an associated CORESET. If more than one DL BWPs of the given DL carrier of the cell are configured with or include the same Type1-PDCCH CSS (including CORESET) within their bandwidths, their associated UL BWPs (in terms of corresponding RACH configuration) of the given UL carrier of the cell may also have the same RACH configuration within bandwidths of the UL BWPs in order to avoid ambiguity at the UE while receiving RAR. In one example, association between the given RACH configuration and the Type1-PDCCH CSS can be defined and/or indicated according by a pair of DL BWP and/or UL BWP IDs. That is, if higher layer signaling indicates an DL/UL BWP ID-pair (4, 3) as shown in FIG. 4, a Type1-PDCCH CSS in a DL BWP with the DL BWP ID set to 4 and a RACH configuration in an UL BWP with the UL BWP ID set to 3 are associated. In another example, association between the given RACH configuration and the Type1-PDCCH CSS is defined and/or indicated according to a BWP ID. That is, UL and DL BWPs with the same BWP ID are associated in terms of RACH configuration and Type1-PDCCH CSS. In other examples, all the RACH configurations indicated to the UE are indexed according to frequency locations of RACH resources of each configuration (e.g., the lowest common PRB index of RACH resources), and all the Type1-PDCCH CSS configurations indicated to the UE are indexed according to time and/or frequency locations of CORESET and/or monitoring occasions of each configuration. As may be appreciated, the UE assumes that RACH and Type1-PDCCH CSS configurations with the same configuration index are associated.

In certain embodiments, a UE receives one or more UL BWP configurations for one or more corresponding configured UL BWPs. If the UE has to initiate a CBRA procedure for uplink timing synchronization and/or SR, the UE may identify whether there is at least one RACH configuration within a bandwidth of a current active UL BWP from the received one or more UL BWP configurations. If the at least one RACH configuration is identified within the bandwidth of the active UL BWP, the UE may select one RACH configuration from the identified at least one RACH configuration and may transmit RACH preambles according to the selected one RACH configuration. If a Type1-PDCCH CSS associated with the selected RACH configuration is not within a bandwidth of an active DL BWP, the UE may switch to a DL BWP for reception of Msg2 and Msg4. As may be appreciated, a DL BWP configuration of the DL BWP may include configuration information for the Type1-PDCCH CSS.

In some embodiments, if more than one RACH configuration exists within a bandwidth of an active UL BWP, the UE may prioritize and employ a RACH configuration of a current active UL BWP configuration over other RACH configurations within the bandwidth of the active UL BWP. Further, if the active UL BWP configuration does not include a RACH configuration, the UE may select a RACH configuration indicated via an UL BWP configuration of an UL BWP with the same numerology as the active UL BWP. If any UL BWP with a numerology the same as the active UL BWP does not have a RACH configuration, the UE may select a RACH configuration indicated via an UL BWP configuration of an UL BWP with a smallest subcarrier spacing. As may be appreciated, this may be beneficial for reliable UL transmissions during a random access procedure such as Message 3 (e.g., Msg3) PUSCH and Msg4 HARQ-ACK feedback. In one embodiment, if any UL BWP with a numerology the same as the active UL BWP does not have a RACH configuration, the UE may select a RACH configuration indicated via an UL BWP configuration of an UL BWP with a largest SCS that is smaller than the SCS of the active UL BWP configuration. In various embodiments, the UE may select a RACH configuration indicated via an UL BWP configuration of an UL BWP having a numerology suitable for a logical channel (or logical channel group) triggering SR. In certain embodiments, the UE may prioritize and employ a RACH configuration associated with a Type1-PDCCH CSS within the bandwidth of the active DL BWP. As may be appreciated, a UE may use combinations of any prioritization and/or selection criteria described herein to select one RACH configuration.

In some embodiments, if any UL BWP configuration does not include any RACH configuration within the bandwidth of the active UL BWP, then the UE may switch to a different configured UL BWP that can be an initial UL BWP or a higher-layer (e.g., RRC) configured default UL BWP and, accordingly, the UE also may switch to an initial DL BWP or a higher-layer configured default DL BWP. In various embodiments, the UE may switch to a configured UL BWP that has a RACH configuration within its bandwidth and a numerology suitable for a logical channel (or logical channel group) triggering SR.

In various embodiments, a UE may receive one or more UL/DL BWP configuration for one or more corresponding configured UL/DL BWPs. If the UE has to initiate a CBRA procedure, the UE may identify whether there is at least one CORESET for Type1-PDCCH CSS within a bandwidth of a current active DL BWP from the received one or more DL BWP configurations. If the at least one CORESET for Type1-PDCCH CSS is identified within the bandwidth of the active DL BWP, the UE may select one CORESET for Type1-PDCCH CSS from the identified at least one CORESET for Type1-PDCCH CSS such that a RACH configuration associated with the selected one CORESET for Type1-PDCCH CSS is configured in an UL BWP with a numerology suitable for a logical channel (or logical channel group) triggering SR. In some embodiments, the UE may: select one CORESET for Type1-PDCCH CSS that is configured via a DL BWP configuration of the active DL BWP; determine a RACH configuration associated with the selected CORESET for Type1-PDCCH CSS; and switch to a corresponding UL BWP that is configured with the determined RACH configuration.

In certain embodiments, a DCI format that orders a UE to perform contention-free or contention-based random access and/or a dedicated RACH configuration signaling may include an indication of an UL BWP and/or a RACH configuration (e.g., UL BWP ID and/or RACH configuration index) on which the UE transmits PRACH preambles. In various embodiments, based on a configured or predefined association between a RACH configuration and a Type1-PDCCH CSS, a UE may determine a new active DL BWP. In such embodiments, the Type1-PDCCH CSS associated with the indicated RACH configuration is configured.

In some embodiments, if a UE selects a RACH configuration for PRACH transmission that is not configured in a current active UL BWP but is within a bandwidth of the current active UL BWP, the UE may identify allocated PRBs for Msg3 transmission based on local PRB indexing of an UL BWP that is configured with the selected RACH configuration. Moreover, if the UE selects and monitors a PDCCH CSS that is not configured in a current active DL BWP but is within a bandwidth of the current active DL BWP, the UE may identify allocated PRBs for PDSCHs that are associated with PDCCHs from the selected and monitored PDCCH CSS based on local PRB indexing of a DL BWP that is configured with the selected PDCCH CSS.

FIG. 4 is a schematic block diagram illustrating one embodiment of paired BWP configurations 400. The paired BWP configurations 400 include a first DL BWP 402, a second DL BWP 404, a third DL BWP 406, a fourth DL BWP 408, a first UL BWP 410, a second UL BWP 412, and a third UL BWP 414 that are illustrated across a frequency 416. As illustrated, the frequency 416 of the first DL BWP 402, the second DL BWP 404, the third DL BWP 406, and the fourth DL BWP 408 all overlap. Moreover, the frequency 416 of the first UL BWP 410, the second UL BWP 412, and the third UL BWP 414 all overlap. The first DL BWP 402, the second DL BWP 404, the first UL BWP 410, and the second UL BWP 412 all operate with 15 kHz SCS. Moreover, the third DL BWP 406 operates with 60 kHz SCS.

Furthermore, the fourth DL BWP 408 and the third UL BWP 414 operate with 30 kHz SCS.

The first DL BWP 402 includes a first CORESET 418 for CSS that is associated with a first PRACH 420 of the first UL BWP 410. The second DL BWP 404 includes a first frequency range 422 that corresponds to the first CORESET 418 thereby enabling the first DL BWP 402 and the second DL BWP 404 to both use the first CORESET 418. Furthermore, the second UL BWP 412 includes a second frequency range 424 that corresponds to the first PRACH 420 thereby enabling the first UL BWP 410 and the second UL BWP 412 to both use the first PRACH 420. The fourth DL BWP 408 includes a second CORESET 426 for CSS that is associated with a second PRACH 428 of the third UL BWP 414.

In certain embodiments, before a UE has a valid dedicated PUCCH configuration (e.g., during RRC connection set-up or RRC connection re-establishment procedures), the UE may transmit one bit HARQ-ACK feedback without HARQ-ACK bundling in response to reception of a PDSCH. In such embodiments, a 4-bit indication in SIM may be used for PUCCH resource allocation for HARQ-ACK. Moreover, the 4-bit indication may indicate an entry into a 16-row table and each row in the table may configure a set of cell-specific (e.g., common) PUCCH resources and/or parameters. In one example, each set of common PUCCH resources includes 16 PUCCH resources that are configured with the same PUCCH format and PUCCH duration along with frequency hopping. Since only 1 bit UCI is expected, PUCCH format 0 with PUCCH duration of 2 symbols and PUCCH format 1 with PUCCH duration of {4, 10, 14} symbols may be considered, where both PUCCH format 0 and PUCCH format 1 occupy 12 subcarriers (e.g., 1 PRB). For PUCCH format 1 with PUCCH duration of {10, 14} symbols, both cyclic shift values and time-domain OCC may be used to increase the number of available PUCCH resources with a limited number of PRBs. Meanwhile, for PUCCH format 0, more PRBs may be assigned for a set of common PUCCH resources, as 2 cyclic shift values are needed for 1 bit indication.

As may be appreciated, in dedicated PUCCH resource configuration, a higher layer parameter 'PUCCH-SpatialRelationInfo' may indicate a PUCCH pathloss reference signal, a spatially associated DL or UL reference signal, a UE-specific open-loop power control parameter, and/or a closed-loop power control process. At a given time, each PUCCH resource may be associated with one 'PUCCH-SpatialRelationInfo' configuration, and the association between a PUCCH resource and a 'PUCCH-SpatialRelationInfo' configuration may change via a MAC CE signaling and/or a RRC signaling.

In some embodiments, before RRC connection set-up or receiving dedicated RRC configuration, the UE may transmit PUCCH using the same spatial domain transmission filter used for the Msg3 PUSCH transmission. Moreover, the spatial domain transmission filter used for the Msg3 PUSCH transmission may be associated with a selected SS/PBCH block for Msg1 PRACH transmission. Thus, both the PUCCH pathloss reference signal and the spatially associated DL reference signal correspond to the SS/PBCH block selected for Msg1 transmission. Further, the UE may maintain only one closed-loop power control process, and UE-specific power control parameter may be set to zero.

The common PUCCH resource set for PUCCH format 0 with 2 symbol duration and the common PUCCH resource set for PUCCH format 1 with 4 symbol duration may be chosen if a network entity has a large number of antenna elements and employs narrow transmit and receive beams with large beamforming gains. That is, short transmission time for PUCCH may be compensated by large receive beamforming gains. Taking into account a maximum number of 64 SS/PBCH blocks within a 5 ms time window with potentially different spatial coverages, allowing multiple starting symbols within a slot for PUCCH resources with short duration (e.g., 2 symbol, 4 symbol) may be beneficial to accommodate TDM of PUCCH resources associated with different SS/PBCH blocks within the slot. With TDM of common PUCCH resources within the slot, the UE may send HARQ-ACK feedback for Msg4 without long delay and, accordingly, may achieve successful RACH completion before a random access contention resolution timer expires.

Table 1 presents an example of a common PUCCH resource set configuration. A PUCCH resource indicator field of 3 bits and a downlink assignment index field of 2 bits in DCI format 1_0 may be used to dynamically select a PUCCH resource from a common PUCCH resource set with a size of up to 32 PUCCH resources. Moreover, implicit mapping, for example, based on CCE indices for PDCCH carrying the DCI format 1_0, may be jointly used with the bit fields in the DCI format 1_0 to dynamically select a PUCCH resource. Table 1 shows 16 PUCCH resources per PUCCH resource set, and additional resources may be defined by adding more PRBs, cyclic shift values, stating symbols (for PUCCH format 0 with 2 symbol duration and PUCCH format 1 with 4 symbol duration) and/or OCC indices (for PUCCH format 1 with 14 symbol duration).

Depending on operating FRs (e.g., FR1 (below 6 GHz) and FR2 (above 6 GHz)), different PUCCH resource sets may be defined. That is, for FR2, more configurations with short PUCCH duration (e.g., 2, 4, or 6 symbols) and/or a larger number of different staring symbols of PUCCH resources may be defined, as shown in Table 2.

TABLE 1

PUCCH Resource Sets Before Dedicated PUCCH Resource Configuration For FR1

| Index | PUCCH Format | First Symbol | Number Of Symbols | Cyclic Shift Index | Local PRB Indices For The First And Second Frequency Hops | OCC Index |
|---|---|---|---|---|---|---|
| 0 | 1 | 0 | 14 | 0, 3, 6, 9, 1, 4, 7, 10 | (0, $N_{RB}$-1) | 0, 1 |
| 1 | 1 | 0 | 14 | 0, 3, 6, 9, 1, 4, 7, 10 | (1, $N_{RB}$-2) | 0, 1 |
| 2 | 1 | 0 | 14 | 0, 3, 6, 9, 1, 4, 7, 10 | ($N_{RB}$-2, 1) | 0, 1 |
| 3 | 1 | 0 | 14 | 0, 3, 6, 9, 1, 4, 7, 10 | ($N_{RB}$-1, 0) | 0, 1 |
| 4 | 1 | 4 | 10 | 0, 3, 6, 9, 1, 4, 7, 10 | (0, $N_{RB}$-1) | 0, 1 |
| 5 | 1 | 4 | 10 | 0, 3, 6, 9, 1, 4, 7, 10 | (1, $N_{RB}$-2) | 0, 1 |
| 6 | 1 | 4 | 10 | 0, 3, 6, 9, 1, 4, 7, 10 | ($N_{RB}$-2, 1) | 0, 1 |
| 7 | 1 | 4 | 10 | 0, 3, 6, 9, 1, 4, 7, 10 | ($N_{RB}$-1, 0) | 0, 1 |
| 8 | 1 | 6, 10 | 4 | 0, 3, 6, 9, 1, 4, 7, 10 | (0, $N_{RB}$-1) | 0 |
| 9 | 1 | 6, 10 | 4 | 0, 3, 6, 9, 1, 4, 7, 10 | (1, $N_{RB}$-2) | 0 |
| 10 | 1 | 6, 10 | 4 | 0, 3, 6, 9, 1, 4, 7, 10 | ($N_{RB}$-2, 1) | 0 |
| 11 | 1 | 6, 10 | 4 | 0, 3, 6, 9, 1, 4, 7, 10 | ($N_{RB}$-1, 0) | 0 |
| 12 | 0 | 10, 12 | 2 | (0, 6) (1, 7), (3, 9), (4, 10) | (0, $N_{RB}$-1), (1, $N_{RB}$-2) | N/A |
| 13 | 0 | 10, 12 | 2 | (0, 6) (1, 7), (3, 9), (4, 10) | (2, $N_{RB}$-3), (3, $N_{RB}$-4) | N/A |
| 14 | 0 | 10, 12 | 2 | (0, 6) (1, 7), (3, 9), (4, 10) | ($N_{RB}$-3, 2), ($N_{RB}$-4, 3) | N/A |
| 15 | 0 | 10, 12 | 2 | (0, 6) (1, 7), (3, 9), (4, 10) | ($N_{RB}$-1, 0), ($N_{RB}$-2, 1) | N/A |

Note:
$N_{RB}$ is a number of PRBs in an initial UL BWP.

TABLE 2

PUCCH Resource Sets Before Dedicated PUCCH Resource Configuration For FR2

| Index | PUCCH Format | First Symbol | Number Of Symbols | Cyclic Shift Index | Local PRB Indices For The First And Second Hops | Frequency OCC Index |
|---|---|---|---|---|---|---|
| 0 | 1 | 4 | 10 | 0, 3, 6, 9, 1, 4, 7, 10 | (0, $N_{RB}$-1) | 0, 1 |
| 1 | 1 | 4 | 10 | 0, 3, 6, 9, 1, 4, 7, 10 | (1, $N_{RB}$-2) | 0, 1 |
| 2 | 1 | 4 | 10 | 0, 3, 6, 9, 1, 4, 7, 10 | ($N_{RB}$-2, 1) | 0, 1 |
| 3 | 1 | 4 | 10 | 0, 3, 6, 9, 1, 4, 7, 10 | ($N_{RB}$-1, 0) | 0, 1 |
| 4 | 1 | 2, 8 | 6 | 0, 3, 6, 9, 1, 4, 7, 10 | (0, $N_{RB}$-1) | 0 |
| 5 | 1 | 2, 8 | 6 | 0, 3, 6, 9, 1, 4, 7, 10 | (1, $N_{RB}$-2) | 0 |
| 6 | 1 | 2, 8 | 6 | 0, 3, 6, 9, 1, 4, 7, 10 | ($N_{RB}$-2, 1) | 0 |
| 7 | 1 | 2, 8 | 6 | 0, 3, 6, 9, 1, 4, 7, 10 | ($N_{RB}$-1, 0) | 0 |
| 8 | 1 | 6, 10 | 4 | 0, 3, 6, 9, 1, 4, 7, 10 | (0, $N_{RB}$-1) | 0 |
| 9 | 1 | 6, 10 | 4 | 0, 3, 6, 9, 1, 4, 7, 10 | (1, $N_{RB}$-2) | 0 |
| 10 | 1 | 6, 10 | 4 | 0, 3, 6, 9, 1, 4, 7, 10 | ($N_{RB}$-2, 1) | 0 |
| 11 | 1 | 6, 10 | 4 | 0, 3, 6, 9, 1, 4, 7, 10 | ($N_{RB}$-1, 0) | 0 |
| 12 | 0 | 10, 12 | 2 | (0, 6) (1, 7), (3, 9), (4, 10) | (0, $N_{RB}$-1), (1, $N_{RB}$-2) | N/A |
| 13 | 0 | 10, 12 | 2 | (0, 6) (1, 7), (3, 9), (4, 10) | (2, $N_{RB}$-3), (3, $N_{RB}$-4) | N/A |
| 14 | 0 | 10, 12 | 2 | (0, 6) (1, 7), (3, 9), (4, 10) | ($N_{RB}$-3, 2), ($N_{RB}$-4, 3) | N/A |
| 15 | 0 | 10, 12 | 2 | (0, 6) (1, 7), (3, 9), (4, 10) | ($N_{RB}$-1, 0), ($N_{RB}$-2, 1), | N/A |

Note:
$N_{RB}$ is a number of PRBs in an initial UL BWP.

Figure 5:
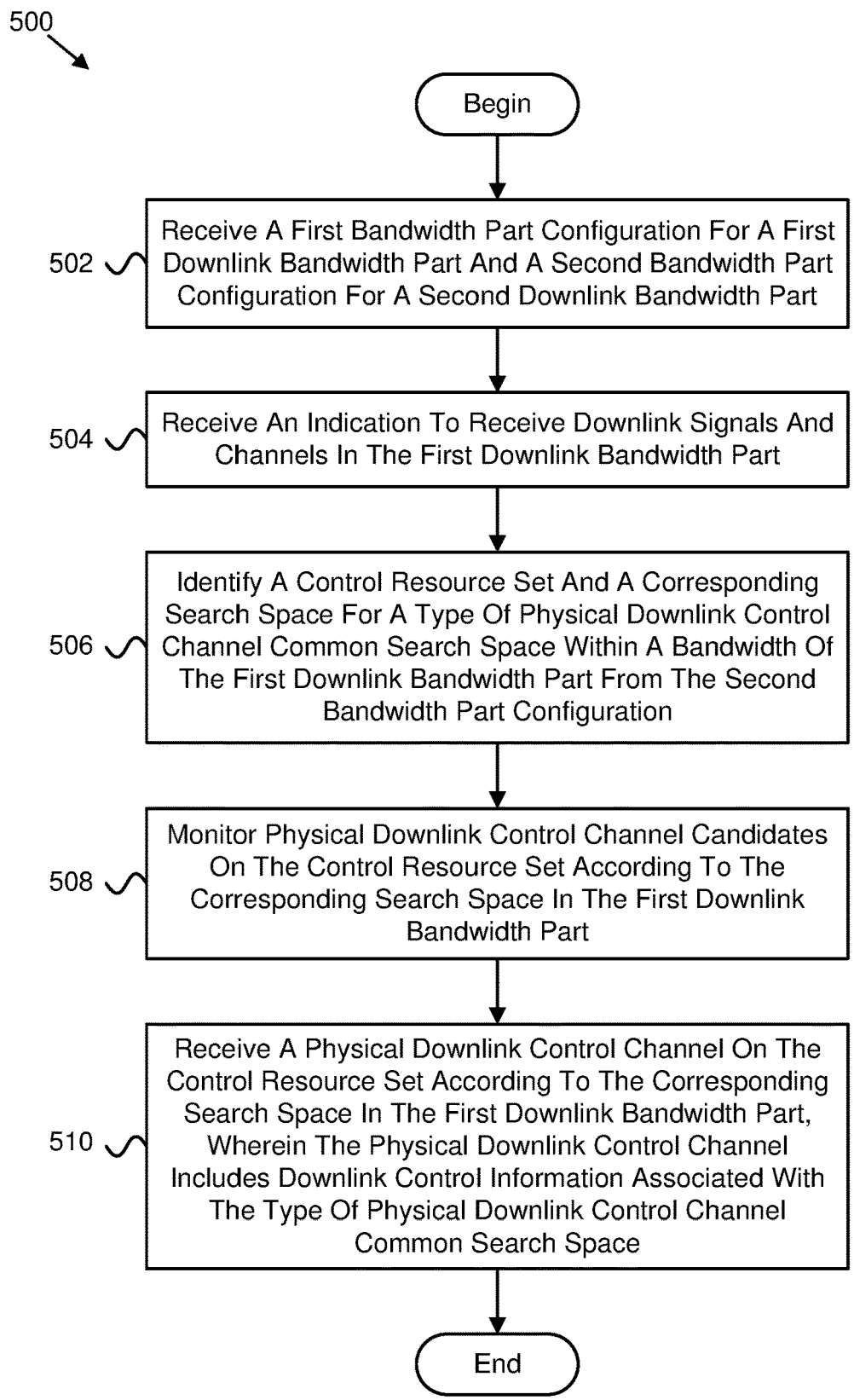
FIG. 5 is a flow chart diagram illustrating one embodiment of a method for configuring bandwidth parts.

FIG. 5 is a flow chart diagram illustrating one embodiment of a method 500 for configuring bandwidth parts. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 a first bandwidth part configuration for a first downlink bandwidth part and a second bandwidth part configuration for a second downlink bandwidth part. In certain embodiments, the method 500 includes receiving 504 an indication to receive downlink signals and channels in the first downlink bandwidth part. In various embodiments, the method 500 includes identifying 506 a control resource set and a corresponding search space for a type of physical downlink control channel common search space within a bandwidth of the first downlink bandwidth part from the second bandwidth part configuration. In some embodiments, the method 500 includes monitoring 508 physical downlink control channel candidates on the control resource set according to the corresponding search space in the first downlink bandwidth part. In certain embodiments, the method 500 includes receiving 510 a physical downlink control channel on the control resource set according to the corresponding search space in the first downlink bandwidth part. In such embodiments, the physical downlink control channel includes downlink control information associated with the type of physical downlink control channel common search space.

In certain embodiments, the method 500 further comprises receiving a physical downlink shared channel carrying a common control message according to the downlink control information of the physical downlink control channel. In some embodiments, the common control message comprises a broadcast system information message, a paging message, a random access response message, a contention resolution message, or some combination thereof. In various embodiments, the first downlink bandwidth part is an active downlink bandwidth part and the second downlink bandwidth part is an initial downlink bandwidth part.

In one embodiment, the downlink control information comprises a short paging message, and the short paging message comprises an indication of system information modification, a commercial mobile alert service indication, an earthquake and tsunami warning system indication, or some combination thereof. In certain embodiments, the method 500 further comprises receiving, on the physical downlink control channel, downlink control information associated with a user equipment-specific search space indicated in the first bandwidth part configuration. In some embodiments, the first bandwidth part configuration does not include information of the control resource set, the first and second downlink bandwidth parts at least partially overlap in frequency, and the control resource set is within an overlapped bandwidth of the first and second downlink bandwidth parts.

In various embodiments, the method 500 further comprises simultaneously receiving the physical downlink control channel on the control resource set according to the corresponding search space and at least one of the downlink signals and channels of the first downlink bandwidth part. In one embodiment, the first and second downlink bandwidth parts have a same numerology, and the numerology comprises at least a subcarrier spacing and a cyclic prefix length. In certain embodiments, the first and second downlink bandwidth parts have different numerologies, and a user equipment is capable of operating with two different numerologies simultaneously.

In some embodiments, the method 500 further comprises skipping a monitoring occasion of the corresponding search space if the control resource set overlaps in time with a user equipment-specific control resource set from the first bandwidth part configuration or a user equipment-specific physical downlink shared channel of the first downlink bandwidth part, wherein the user equipment applies only one receive spatial filter at a given time and the control resource set is not quasi-co-located with the user equipment-specific control resource set or the user equipment-specific physical downlink shared channel in terms of spatial receive parameters during the monitoring occasion.

In various embodiments, the method 500 further comprises: identifying a second control resource set and a corresponding second search space for the type of physical downlink control channel common search space from the first bandwidth part configuration; and selecting the second control resource set and the second search space to receive a second physical downlink control channel including the downlink control information associated with the type of physical downlink control channel common search space; wherein the first bandwidth part configuration includes indications of the second control resource set and the corresponding second search space and the second bandwidth part configuration includes indications of the control resource set and the corresponding search space for the type of physical downlink control channel common search space.

In one embodiment, the method 500 further comprises prioritizing reception of the physical downlink control channel associated with the type of physical downlink control channel common search space over monitoring a user equipment-specific control resource set and reception of a user equipment-specific physical downlink shared channel.

In certain embodiments, the method 500 further comprises identifying association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, wherein the type of physical downlink control channel common search space is a common search space for reception of a random access response message and a contention resolution message.

In some embodiments, the method 500 further comprises: receiving a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity; receiving an indication to transmit uplink signals and channels in the first uplink bandwidth part; determining whether the first uplink bandwidth part includes a random access channel resource according to the third bandwidth part configuration; switching to the second uplink bandwidth part in response to initiation of a random access procedure and the first uplink bandwidth part not including the random access channel resource, wherein the second uplink bandwidth part includes a random access channel resource according to the fourth bandwidth part configuration; and switching to the second downlink bandwidth part based on the association between the random access channel resource in the second uplink bandwidth part and a control resource set and a corresponding search space for the type of physical downlink control channel common search space in the second downlink bandwidth part. In certain embodiments, the first uplink bandwidth part is an active uplink bandwidth part and the second uplink bandwidth part is an initial uplink bandwidth part.

In various embodiments, the method 500 further comprises receiving a downlink control information format or a dedicated radio resource control signaling that orders a user equipment to perform contention-free or contention-based random access, wherein the downlink control information format or the dedicated radio resource control signaling includes an indication of a random access channel configuration for which the user equipment transmits at least one physical random access channel preamble. In one embodiment, the method 500 further comprises: identifying a third control resource set and a corresponding third search space for the type of physical downlink control channel common search space within the bandwidth of the first downlink bandwidth part from a third bandwidth part configuration; and selecting the control resource set and the corresponding search space to monitor the physical downlink control channel candidates; wherein the control resource set and the corresponding search space is configured with a first numerology the same as a second numerology of the first downlink bandwidth part, and the third control resource set and the corresponding third search space is configured with a third numerology different than the second numerology of the first downlink bandwidth part.

Figure 6:
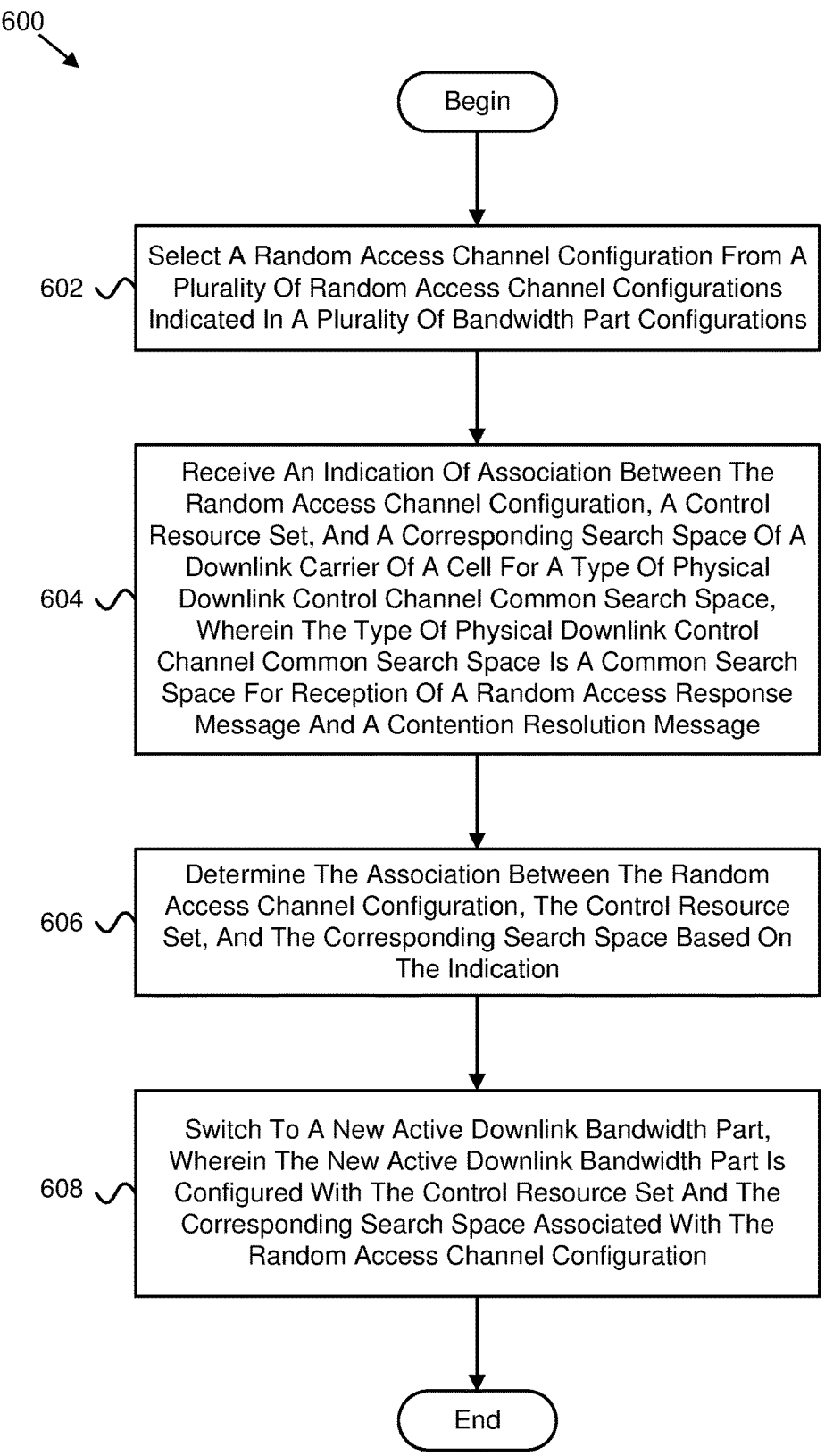
FIG. 6 is a flow chart diagram illustrating another embodiment of a method for configuring bandwidth parts.

FIG. 6 is a flow chart diagram illustrating another embodiment of a method 600 for configuring bandwidth parts. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include selecting 602 a random access channel configuration from a plurality of random access channel configurations indicated in a plurality of bandwidth part configurations. In various embodiments, the method 600 includes receiving 604 an indication of association between the random access channel configuration, a control resource set, and a corresponding search space of a downlink carrier of a cell for a type of physical downlink control channel common search space. In such embodiments, the type of physical downlink control channel common search space is a common search space for reception of a random access response message and a contention resolution message. In certain embodiments, the method 600 includes determining 606 the association between the random access channel configuration, the control resource set, and the corresponding search space based on the indication. In some embodiments, the method 600 includes switching 608 to a new active downlink bandwidth part. In such embodiments, the new active downlink bandwidth part is configured with the control resource set and the corresponding search space associated with the random access channel configuration.

In certain embodiments, the random access channel configuration is configured in an uplink bandwidth part with a numerology suitable for a logical channel triggering a scheduling request. In some embodiments, the random access channel configuration is implicitly indicated via an uplink bandwidth part identity.

Figure 7:
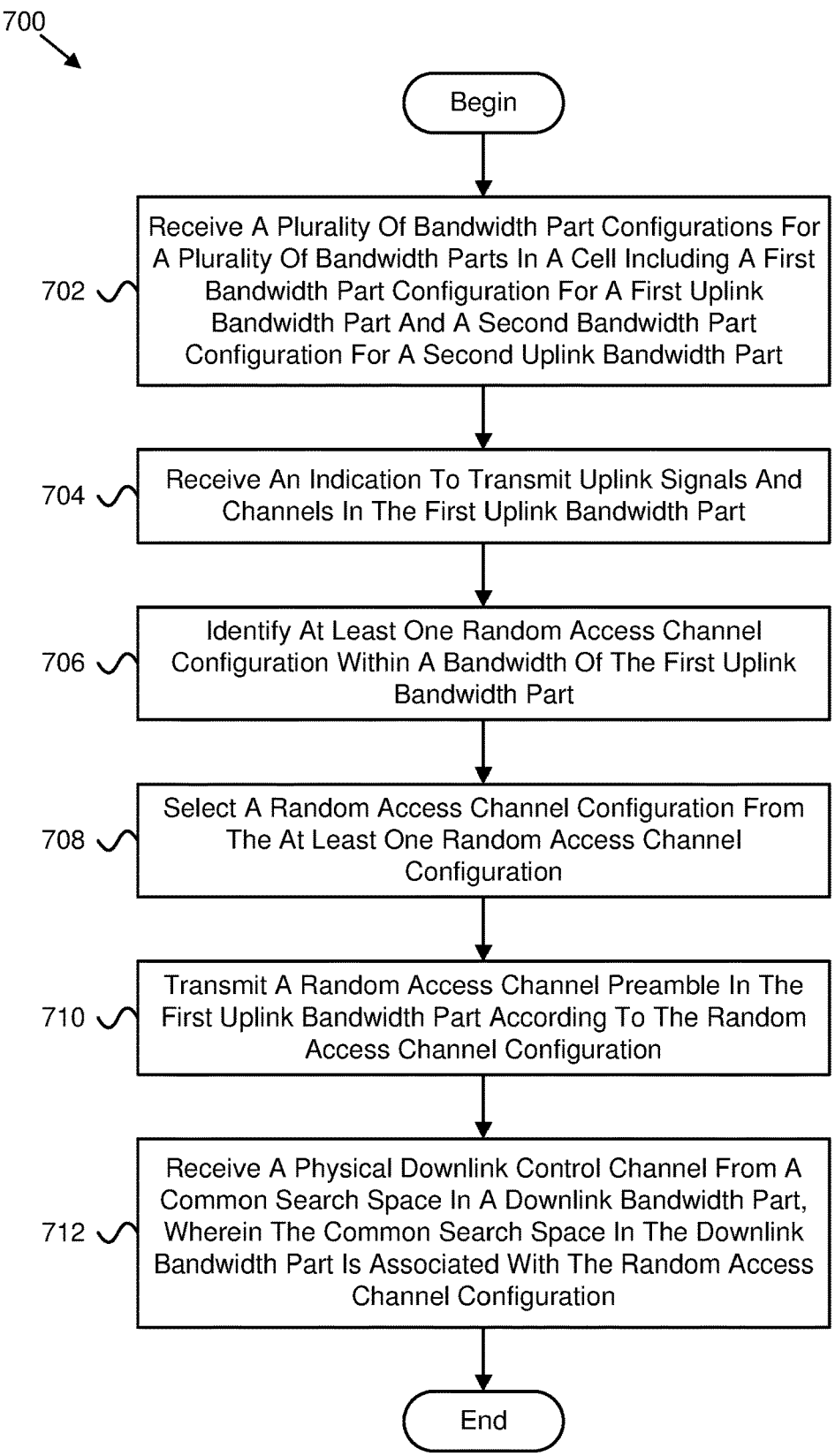
FIG. 7 is a flow chart diagram illustrating a further embodiment of a method for configuring bandwidth parts.

FIG. 7 is a flow chart diagram illustrating a further embodiment of a method 700 for configuring bandwidth parts. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a plurality of bandwidth part configurations for a plurality of bandwidth parts in a cell including a first bandwidth part configuration for a first uplink bandwidth part and a second bandwidth part configuration for a second uplink bandwidth part. In certain embodiments, the method 700 includes receiving 704 an indication to transmit uplink signals and channels in the first uplink bandwidth part. In various embodiments, the method 700 includes identifying 706 at least one random access channel configuration within a bandwidth of the first uplink bandwidth part. In some embodiments, the method 700 includes selecting 708 a random access channel configuration from the at least one random access channel configuration. In certain embodiments, the method 700 includes transmitting 710 a random access channel preamble in the first uplink bandwidth part according to the random access channel configuration. In certain embodiments, the method 700 includes receiving 712 a physical downlink control channel from a common search space in a downlink bandwidth part. In such embodiments, the common search space in the downlink bandwidth part is associated with the random access channel configuration.

In certain embodiments, the physical downlink control channel comprises a downlink control information format with cyclic redundancy check scrambled by one of a random access-radio network temporary identifier, a temporary cell-radio network temporary identifier, or a cell-radio network temporary identifier. In some embodiments, the first bandwidth part configuration does not comprise the at least one random access channel configuration, the second bandwidth part configuration comprises the at least one random access channel configuration, the first and second uplink bandwidth parts at least partially overlap in frequency, and the at least one random access channel configuration is within an overlapped bandwidth of the first and second uplink bandwidth parts. In various embodiments, the method 700 further comprises transmitting message 3 in the overlapped bandwidth of the first and second uplink bandwidth parts.

In one embodiment, the random access channel configuration is configured via the first bandwidth part configuration, the first bandwidth part configuration comprises a first random access channel configuration from the at least one random access channel configuration and the second bandwidth part configuration comprises a second random access channel configuration from the at least one random access channel configuration. In certain embodiments, the random access channel configuration is configured via a bandwidth part configuration of an uplink bandwidth part with a numerology suitable for a logical channel triggering a scheduling request. In some embodiments, the method 700 further comprises receiving an indication of association between a given random access channel configuration in an uplink carrier of the cell and a given random access channel common search space of a downlink carrier of the cell, wherein the random access channel common search space is a common search space for reception of a random access response message and a contention resolution message.

In various embodiments, the given random access channel configuration has the given random access channel common search space within a bandwidth of a current active downlink bandwidth part, and receiving the physical downlink control channel from the common search space in the downlink bandwidth part comprises receiving the physical downlink control channel from the common search space within the bandwidth of the current active downlink bandwidth part. In one embodiment, the method 700 further comprises: selecting a random access channel common search space from one or more random access channel common search space within a bandwidth of an active downlink bandwidth part; determining a second random access channel configuration associated with the random access channel common search space; switching to a third uplink bandwidth part, wherein the third uplink bandwidth part is configured with the second random access channel configuration; and transmitting a second random access channel preamble in the third uplink bandwidth part according to the second random access channel configuration. In certain embodiments, the random access channel common search space is configured via a bandwidth part configuration of the active downlink bandwidth part. In some embodiments, the random access channel common search space is configured with a numerology the same as a numerology of the active downlink bandwidth part.

In one embodiment, a method comprises: receiving a first bandwidth part configuration for a first downlink bandwidth part and a second bandwidth part configuration for a second downlink bandwidth part; receiving an indication to receive downlink signals and channels in the first downlink bandwidth part; identifying a control resource set and a corresponding search space for a type of physical downlink control channel common search space within a bandwidth of the first downlink bandwidth part from the second bandwidth part configuration; monitoring physical downlink control channel candidates on the control resource set according to the corresponding search space in the first downlink bandwidth part; and receiving a physical downlink control channel on the control resource set according to the corresponding search space in the first downlink bandwidth part, wherein the physical downlink control channel includes downlink control information associated with the type of physical downlink control channel common search space.

In certain embodiments, the method further comprises receiving a physical downlink shared channel carrying a common control message according to the downlink control information of the physical downlink control channel.

In some embodiments, the common control message comprises a broadcast system information message, a paging message, a random access response message, a contention resolution message, or some combination thereof.

In various embodiments, the first downlink bandwidth part is an active downlink bandwidth part and the second downlink bandwidth part is an initial downlink bandwidth part.

In one embodiment, the downlink control information comprises a short paging message, and the short paging message comprises an indication of system information modification, a commercial mobile alert service indication, an earthquake and tsunami warning system indication, or some combination thereof.

In certain embodiments, the method further comprises receiving, on the physical downlink control channel, downlink control information associated with a user equipment-specific search space indicated in the first bandwidth part configuration.

In some embodiments, the first bandwidth part configuration does not include information of the control resource set, the first and second downlink bandwidth parts at least partially overlap in frequency, and the control resource set is within an overlapped bandwidth of the first and second downlink bandwidth parts.

In various embodiments, the method further comprises simultaneously receiving the physical downlink control channel on the control resource set according to the corresponding search space and at least one of the downlink signals and channels of the first downlink bandwidth part.

In one embodiment, the first and second downlink bandwidth parts have a same numerology, and the numerology comprises at least a subcarrier spacing and a cyclic prefix length.

In certain embodiments, the first and second downlink bandwidth parts have different numerologies, and a user equipment is capable of operating with two different numerologies simultaneously.

In some embodiments, the method further comprises skipping a monitoring occasion of the corresponding search space if the control resource set overlaps in time with a user equipment-specific control resource set from the first bandwidth part configuration or a user equipment-specific physical downlink shared channel of the first downlink bandwidth part, wherein the user equipment applies only one receive spatial filter at a given time and the control resource set is not quasi-co-located with the user equipment-specific control resource set or the user equipment-specific physical downlink shared channel in terms of spatial receive parameters during the monitoring occasion.

In various embodiments, the method further comprises: identifying a second control resource set and a corresponding second search space for the type of physical downlink control channel common search space from the first bandwidth part configuration; and selecting the second control resource set and the second search space to receive a second physical downlink control channel including the downlink control information associated with the type of physical downlink control channel common search space; wherein the first bandwidth part configuration includes indications of the second control resource set and the corresponding second search space and the second bandwidth part configuration includes indications of the control resource set and the corresponding search space for the type of physical downlink control channel common search space.

In one embodiment, the method further comprises prioritizing reception of the physical downlink control channel associated with the type of physical downlink control channel common search space over monitoring a user equipment-specific control resource set and reception of a user equipment-specific physical downlink shared channel.

In certain embodiments, the method further comprises identifying association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, wherein the type of physical downlink control channel common search space is a common search space for reception of a random access response message and a contention resolution message.

In some embodiments, the method further comprises: receiving a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity; receiving an indication to transmit uplink signals and channels in the first uplink bandwidth part; determining whether the first uplink bandwidth part includes a random access channel resource according to the third bandwidth part configuration; switching to the second uplink bandwidth part in response to initiation of a random access procedure and the first uplink bandwidth part not including the random access channel resource, wherein the second uplink bandwidth part includes a random access channel resource according to the fourth bandwidth part configuration; and switching to the second downlink bandwidth part based on the association between the random access channel resource in the second uplink bandwidth part and a control resource set and a corresponding search space for the type of physical downlink control channel common search space in the second downlink bandwidth part. In certain embodiments, the first uplink bandwidth part is an active uplink bandwidth part and the second uplink bandwidth part is an initial uplink bandwidth part.

In various embodiments, the method further comprises receiving a downlink control information format or a dedicated radio resource control signaling that orders a user equipment to perform contention-free or contention-based random access, wherein the downlink control information format or the dedicated radio resource control signaling includes an indication of a random access channel configuration for which the user equipment transmits at least one physical random access channel preamble.

In one embodiment, the method further comprises: identifying a third control resource set and a corresponding third search space for the type of physical downlink control channel common search space within the bandwidth of the first downlink bandwidth part from a third bandwidth part configuration; and selecting the control resource set and the corresponding search space to monitor the physical downlink control channel candidates; wherein the control resource set and the corresponding search space is configured with a first numerology the same as a second numerology of the first downlink bandwidth part, and the third control resource set and the corresponding third search space is configured with a third numerology different than the second numerology of the first downlink bandwidth part.

In one embodiment, an apparatus comprises: a receiver that: receives a first bandwidth part configuration for a first downlink bandwidth part and a second bandwidth part configuration for a second downlink bandwidth part; and receives an indication to receive downlink signals and channels in the first downlink bandwidth part; and a processor that: identifies a control resource set and a corresponding search space for a type of physical downlink control channel common search space within a bandwidth of the first downlink bandwidth part from the second bandwidth part configuration; and monitors physical downlink control channel candidates on the control resource set according to the corresponding search space in the first downlink bandwidth part; wherein the receiver receives a physical downlink control channel on the control resource set according to the corresponding search space in the first downlink bandwidth part, and the physical downlink control channel includes downlink control information associated with the type of physical downlink control channel common search space.

In certain embodiments, the receiver receives a physical downlink shared channel carrying a common control message according to the downlink control information of the physical downlink control channel.

In some embodiments, the common control message comprises a broadcast system information message, a paging message, a random access response message, a contention resolution message, or some combination thereof.

In various embodiments, the first downlink bandwidth part is an active downlink bandwidth part and the second downlink bandwidth part is an initial downlink bandwidth part.

In one embodiment, the downlink control information comprises a short paging message, and the short paging message comprises an indication of system information modification, a commercial mobile alert service indication, an earthquake and tsunami warning system indication, or some combination thereof.

In certain embodiments, the receiver receives, on the physical downlink control channel, downlink control information associated with a user equipment-specific search space indicated in the first bandwidth part configuration.

In some embodiments, the first bandwidth part configuration does not include information of the control resource set, the first and second downlink bandwidth parts at least partially overlap in frequency, and the control resource set is within an overlapped bandwidth of the first and second downlink bandwidth parts.

In various embodiments, the receiver simultaneously receives the physical downlink control channel on the control resource set according to the corresponding search space and at least one of the downlink signals and channels of the first downlink bandwidth part.

In one embodiment, the first and second downlink bandwidth parts have a same numerology, and the numerology comprises at least a subcarrier spacing and a cyclic prefix length.

In certain embodiments, the first and second downlink bandwidth parts have different numerologies, and a user equipment is capable of operating with two different numerologies simultaneously.

In some embodiments, the processor skips a monitoring occasion of the corresponding search space if the control resource set overlaps in time with a user equipment-specific control resource set from the first bandwidth part configuration or a user equipment-specific physical downlink shared channel of the first downlink bandwidth part, and the user equipment applies only one receive spatial filter at a given time and the control resource set is not quasi-co-located with the user equipment-specific control resource set or the user equipment-specific physical downlink shared channel in terms of spatial receive parameters during the monitoring occasion.

In various embodiments, the processor: identifies a second control resource set and a corresponding second search space for the type of physical downlink control channel common search space from the first bandwidth part configuration; and selects the second control resource set and the second search space to receive a second physical downlink control channel including the downlink control information associated with the type of physical downlink control channel common search space; wherein the first bandwidth part configuration includes indications of the second control resource set and the corresponding second search space and the second bandwidth part configuration includes indications of the control resource set and the corresponding search space for the type of physical downlink control channel common search space.

In one embodiment, the processor prioritizes reception of the physical downlink control channel associated with the type of physical downlink control channel common search space over monitoring a user equipment-specific control resource set and reception of a user equipment-specific physical downlink shared channel.

In certain embodiments, the processor identifies association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, and the type of physical downlink control channel common search space is a common search space for reception of a random access response message and a contention resolution message.

In some embodiments, the receiver: receives a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity; and receives an indication to transmit uplink signals and channels in the first uplink bandwidth part; and the processor: determines whether the first uplink bandwidth part includes a random access channel resource according to the third bandwidth part configuration; switches to the second uplink bandwidth part in response to initiation of a random access procedure and the first uplink bandwidth part not including the random access channel resource, wherein the second uplink bandwidth part includes a random access channel resource according to the fourth bandwidth part configuration; and switches to the second downlink bandwidth part based on the association between the random access channel resource in the second uplink bandwidth part and a control resource set and a corresponding search space for the type of physical downlink control channel common search space in the second downlink bandwidth part. In certain embodiments, the first uplink bandwidth part is an active uplink bandwidth part and the second uplink bandwidth part is an initial uplink bandwidth part.

In various embodiments, the receiver receives a downlink control information format or a dedicated radio resource control signaling that orders a user equipment to perform contention-free or contention-based random access, and the downlink control information format or the dedicated radio resource control signaling includes an indication of a random access channel configuration for which the user equipment transmits at least one physical random access channel preamble.

In one embodiment, the processor: identifies a third control resource set and a corresponding third search space for the type of physical downlink control channel common search space within the bandwidth of the first downlink bandwidth part from a third bandwidth part configuration; and selects the control resource set and the corresponding search space to monitor the physical downlink control channel candidates; wherein the control resource set and the corresponding search space is configured with a first numerology the same as a second numerology of the first downlink bandwidth part, and the third control resource set and the corresponding third search space is configured with a third numerology different than the second numerology of the first downlink bandwidth part.

In one embodiment, a method comprises: transmitting a first bandwidth part configuration for a first downlink bandwidth part and a second bandwidth part configuration for a second downlink bandwidth part to a remote unit; transmitting an indication to receive downlink signals and channels in the first downlink bandwidth part to the remote unit, wherein the remote unit: identifies a control resource set and a corresponding search space for a type of physical downlink control channel common search space within a bandwidth of the first downlink bandwidth part from the second bandwidth part configuration; and monitors physical downlink control channel candidates on the control resource set according to the corresponding search space in the first downlink bandwidth part; and transmitting a physical downlink control channel on the control resource set to the remote unit according to the corresponding search space in the first downlink bandwidth part, wherein the physical downlink control channel includes downlink control information associated with the type of physical downlink control channel common search space.

In certain embodiments, the method further comprises transmitting a physical downlink shared channel carrying a common control message according to the downlink control information of the physical downlink control channel.

In some embodiments, the common control message comprises a broadcast system information message, a paging message, a random access response message, a contention resolution message, or some combination thereof.

In various embodiments, the first downlink bandwidth part is an active downlink bandwidth part and the second downlink bandwidth part is an initial downlink bandwidth part.

In one embodiment, the downlink control information comprises a short paging message, and the short paging message comprises an indication of system information modification, a commercial mobile alert service indication, an earthquake and tsunami warning system indication, or some combination thereof.

In certain embodiments, the method further comprises transmitting, on the physical downlink control channel, downlink control information associated with a user equipment-specific search space indicated in the first bandwidth part configuration.

In some embodiments, the first bandwidth part configuration does not include information of the control resource set, the first and second downlink bandwidth parts at least partially overlap in frequency, and the control resource set is within an overlapped bandwidth of the first and second downlink bandwidth parts.

In various embodiments, the method further comprises simultaneously transmitting the physical downlink control channel on the control resource set according to the corresponding search space and at least one of the downlink signals and channels of the first downlink bandwidth part.

In one embodiment, the first and second downlink bandwidth parts have a same numerology, and the numerology comprises at least a subcarrier spacing and a cyclic prefix length.

In certain embodiments, the first and second downlink bandwidth parts have different numerologies, and a user equipment is capable of operating with two different numerologies simultaneously.

In some embodiments, the remote unit skips a monitoring occasion of the corresponding search space if the control resource set overlaps in time with a user equipment-specific control resource set from the first bandwidth part configuration or a user equipment-specific physical downlink shared channel of the first downlink bandwidth part, and the user equipment applies only one receive spatial filter at a given time and the control resource set is not quasi-co-located with the user equipment-specific control resource set or the user equipment-specific physical downlink shared channel in terms of spatial receive parameters during the monitoring occasion.

In various embodiments, the remote unit: identifies a second control resource set and a corresponding second search space for the type of physical downlink control channel common search space from the first bandwidth part configuration; and selects the second control resource set and the second search space to receive a second physical downlink control channel including the downlink control information associated with the type of physical downlink control channel common search space; and the first bandwidth part configuration includes indications of the second control resource set and the corresponding second search space and the second bandwidth part configuration includes indications of the control resource set and the corresponding search space for the type of physical downlink control channel common search space.

In one embodiment, the remote unit prioritizes reception of the physical downlink control channel associated with the type of physical downlink control channel common search space over monitoring a user equipment-specific control resource set and reception of a user equipment-specific physical downlink shared channel.

In certain embodiments, the remote unit identifies association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, and the type of physical downlink control channel common search space is a common search space for reception of a random access response message and a contention resolution message.

In some embodiments, the method further comprises: transmitting a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity; and transmitting an indication to transmit uplink signals and channels in the first uplink bandwidth part, wherein the remote unit: determines whether the first uplink bandwidth part includes a random access channel resource according to the third bandwidth part configuration; switches to the second uplink bandwidth part in response to initiation of a random access procedure and the first uplink bandwidth part not including the random access channel resource, wherein the second uplink bandwidth part includes a random access channel resource according to the fourth bandwidth part configuration; and switches to the second downlink bandwidth part based on the association between the random access channel resource in the second uplink bandwidth part and a control resource set and a corresponding search space for the type of physical downlink control channel common search space in the second downlink bandwidth part.

In various embodiments, the first uplink bandwidth part is an active uplink bandwidth part and the second uplink bandwidth part is an initial uplink bandwidth part.

In one embodiment, the method further comprises transmitting a downlink control information format or a dedicated radio resource control signaling that orders a user equipment to perform contention-free or contention-based random access, wherein the downlink control information format or the dedicated radio resource control signaling includes an indication of a random access channel configuration for which the user equipment transmits at least one physical random access channel preamble.

In certain embodiments, the remote unit: identifies a third control resource set and a corresponding third search space for the type of physical downlink control channel common search space within the bandwidth of the first downlink bandwidth part from a third bandwidth part configuration; and selects the control resource set and the corresponding search space to monitor the physical downlink control channel candidates; and the control resource set and the corresponding search space is configured with a first numerology the same as a second numerology of the first downlink bandwidth part, and the third control resource set and the corresponding third search space is configured with a third numerology different than the second numerology of the first downlink bandwidth part.

In one embodiment, an apparatus comprises: a transmitter that: transmits a first bandwidth part configuration for a first downlink bandwidth part and a second bandwidth part configuration for a second downlink bandwidth part to a remote unit; transmits an indication to receive downlink signals and channels in the first downlink bandwidth part to the remote unit, wherein the remote unit: identifies a control resource set and a corresponding search space for a type of physical downlink control channel common search space within a bandwidth of the first downlink bandwidth part from the second bandwidth part configuration; and monitors physical downlink control channel candidates on the control resource set according to the corresponding search space in the first downlink bandwidth part; and transmits a physical downlink control channel on the control resource set to the remote unit according to the corresponding search space in the first downlink bandwidth part, wherein the physical downlink control channel includes downlink control information associated with the type of physical downlink control channel common search space.

In certain embodiments, the transmitter transmits a physical downlink shared channel carrying a common control message according to the downlink control information of the physical downlink control channel.

In some embodiments, the common control message comprises a broadcast system information message, a paging message, a random access response message, a contention resolution message, or some combination thereof.

In various embodiments, the first downlink bandwidth part is an active downlink bandwidth part and the second downlink bandwidth part is an initial downlink bandwidth part.

In one embodiment, the downlink control information comprises a short paging message, and the short paging message comprises an indication of system information modification, a commercial mobile alert service indication, an earthquake and tsunami warning system indication, or some combination thereof.

In certain embodiments, the transmitter transmits, on the physical downlink control channel, downlink control information associated with a user equipment-specific search space indicated in the first bandwidth part configuration.

In some embodiments, the first bandwidth part configuration does not include information of the control resource set, the first and second downlink bandwidth parts at least partially overlap in frequency, and the control resource set is within an overlapped bandwidth of the first and second downlink bandwidth parts.

In various embodiments, the transmitter simultaneously transmits the physical downlink control channel on the control resource set according to the corresponding search space and at least one of the downlink signals and channels of the first downlink bandwidth part.

In one embodiment, the first and second downlink bandwidth parts have a same numerology, and the numerology comprises at least a subcarrier spacing and a cyclic prefix length.

In certain embodiments, the first and second downlink bandwidth parts have different numerologies, and a user equipment is capable of operating with two different numerologies simultaneously.

In some embodiments, the remote unit skips a monitoring occasion of the corresponding search space if the control resource set overlaps in time with a user equipment-specific control resource set from the first bandwidth part configuration or a user equipment-specific physical downlink shared channel of the first downlink bandwidth part, and the user equipment applies only one receive spatial filter at a given time and the control resource set is not quasi-co-located with the user equipment-specific control resource set or the user equipment-specific physical downlink shared channel in terms of spatial receive parameters during the monitoring occasion.

In various embodiments, the remote unit: identifies a second control resource set and a corresponding second search space for the type of physical downlink control channel common search space from the first bandwidth part configuration; and selects the second control resource set and the second search space to receive a second physical downlink control channel including the downlink control information associated with the type of physical downlink control channel common search space; and the first bandwidth part configuration includes indications of the second control resource set and the corresponding second search space and the second bandwidth part configuration includes indications of the control resource set and the corresponding search space for the type of physical downlink control channel common search space.

In one embodiment, the remote unit prioritizes reception of the physical downlink control channel associated with the type of physical downlink control channel common search space over monitoring a user equipment-specific control resource set and reception of a user equipment-specific physical downlink shared channel.

In certain embodiments, the remote unit identifies association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, and the type of physical downlink control channel common search space is a common search space for reception of a random access response message and a contention resolution message.

In some embodiments, the transmitter transmits a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity; and the transmitter transmits an indication to transmit uplink signals and channels in the first uplink bandwidth part, wherein the remote unit: determines whether the first uplink bandwidth part includes a random access channel resource according to the third bandwidth part configuration; switches to the second uplink bandwidth part in response to initiation of a random access procedure and the first uplink bandwidth part not including the random access channel resource, wherein the second uplink bandwidth part includes a random access channel resource according to the fourth bandwidth part configuration; and switches to the second downlink bandwidth part based on the association between the random access channel resource in the second uplink bandwidth part and a control resource set and a corresponding search space for the type of physical downlink control channel common search space in the second downlink bandwidth part.

In various embodiments, the first uplink bandwidth part is an active uplink bandwidth part and the second uplink bandwidth part is an initial uplink bandwidth part.

In one embodiment, the transmitter transmits a downlink control information format or a dedicated radio resource control signaling that orders a user equipment to perform contention-free or contention-based random access, wherein the downlink control information format or the dedicated radio resource control signaling includes an indication of a random access channel configuration for which the user equipment transmits at least one physical random access channel preamble.

In certain embodiments, the remote unit: identifies a third control resource set and a corresponding third search space for the type of physical downlink control channel common search space within the bandwidth of the first downlink bandwidth part from a third bandwidth part configuration; and selects the control resource set and the corresponding search space to monitor the physical downlink control channel candidates; and the control resource set and the corresponding search space is configured with a first numerology the same as a second numerology of the first downlink bandwidth part, and the third control resource set and the corresponding third search space is configured with a third numerology different than the second numerology of the first downlink bandwidth part.

In one embodiment, a method comprises: selecting a random access channel configuration from a plurality of random access channel configurations indicated in a plurality of bandwidth part configurations; receiving an indication of association between the random access channel configuration, a control resource set, and a corresponding search space of a downlink carrier of a cell for a type of physical downlink control channel common search space, wherein the type of physical downlink control channel common search space is a common search space for reception of a random access response message and a contention resolution message; determining the association between the random access channel configuration, the control resource set, and the corresponding search space based on the indication; and switching to a new active downlink bandwidth part, wherein the new active downlink bandwidth part is configured with the control resource set and the corresponding search space associated with the random access channel configuration.

In certain embodiments, the random access channel configuration is configured in an uplink bandwidth part with a numerology suitable for a logical channel triggering a scheduling request.

In some embodiments, the random access channel configuration is implicitly indicated via an uplink bandwidth part identity.

In one embodiment, an apparatus comprises: a processor that selects a random access channel configuration from a plurality of random access channel configurations indicated in a plurality of bandwidth part configurations; and a receiver that receives an indication of association between the random access channel configuration, a control resource set, and a corresponding search space of a downlink carrier of a cell for a type of physical downlink control channel common search space, wherein the type of physical downlink control channel common search space is a common search space for reception of a random access response message and a contention resolution message; wherein the processor: determines the association between the random access channel configuration, the control resource set, and the corresponding search space based on the indication; and switches to a new active downlink bandwidth part, and the new active downlink bandwidth part is configured with the control resource set and the corresponding search space associated with the random access channel configuration.

In certain embodiments, the random access channel configuration is configured in an uplink bandwidth part with a numerology suitable for a logical channel triggering a scheduling request.

In some embodiments, the random access channel configuration is implicitly indicated via an uplink bandwidth part identity.

In one embodiment, a method comprises: receiving a plurality of bandwidth part configurations for a plurality of bandwidth parts in a cell including a first bandwidth part configuration for a first uplink bandwidth part and a second bandwidth part configuration for a second uplink bandwidth part; receiving an indication to transmit uplink signals and channels in the first uplink bandwidth part; identifying at least one random access channel configuration within a bandwidth of the first uplink bandwidth part; selecting a random access channel configuration from the at least one random access channel configuration; transmitting a random access channel preamble in the first uplink bandwidth part according to the random access channel configuration; and receiving a physical downlink control channel from a common search space in a downlink bandwidth part, wherein the common search space in the downlink bandwidth part is associated with the random access channel configuration.

In certain embodiments, the physical downlink control channel comprises a downlink control information format with cyclic redundancy check scrambled by one of a random access-radio network temporary identifier, a temporary cell-radio network temporary identifier, or a cell-radio network temporary identifier.

In some embodiments, the first bandwidth part configuration does not comprise the at least one random access channel configuration, the second bandwidth part configuration comprises the at least one random access channel configuration, the first and second uplink bandwidth parts at least partially overlap in frequency, and the at least one random access channel configuration is within an overlapped bandwidth of the first and second uplink bandwidth parts.

In various embodiments, the method further comprises transmitting message 3 in the overlapped bandwidth of the first and second uplink bandwidth parts.

In one embodiment, the random access channel configuration is configured via the first bandwidth part configuration, the first bandwidth part configuration comprises a first random access channel configuration from the at least one random access channel configuration and the second bandwidth part configuration comprises a second random access channel configuration from the at least one random access channel configuration.

In certain embodiments, the random access channel configuration is configured via a bandwidth part configuration of an uplink bandwidth part with a numerology suitable for a logical channel triggering a scheduling request.

In some embodiments, the method further comprises receiving an indication of association between a given random access channel configuration in an uplink carrier of the cell and a given random access channel common search space of a downlink carrier of the cell, wherein the random access channel common search space is a common search space for reception of a random access response message and a contention resolution message.

In various embodiments, the given random access channel configuration has the given random access channel common search space within a bandwidth of a current active downlink bandwidth part, and receiving the physical downlink control channel from the common search space in the downlink bandwidth part comprises receiving the physical downlink control channel from the common search space within the bandwidth of the current active downlink bandwidth part.

In one embodiment, the method further comprises: selecting a random access channel common search space from one or more random access channel common search space within a bandwidth of an active downlink bandwidth part; determining a second random access channel configuration associated with the random access channel common search space; switching to a third uplink bandwidth part, wherein the third uplink bandwidth part is configured with the second random access channel configuration; and transmitting a second random access channel preamble in the third uplink bandwidth part according to the second random access channel configuration.

In certain embodiments, the random access channel common search space is configured via a bandwidth part configuration of the active downlink bandwidth part.

In some embodiments, the random access channel common search space is configured with a numerology the same as a numerology of the active downlink bandwidth part.

In one embodiment, an apparatus comprises: a receiver that: receives a plurality of bandwidth part configurations for a plurality of bandwidth parts in a cell including a first bandwidth part configuration for a first uplink bandwidth part and a second bandwidth part configuration for a second uplink bandwidth part; and receives an indication to transmit uplink signals and channels in the first uplink bandwidth part; a processor that: identifies at least one random access channel configuration within a bandwidth of the first uplink bandwidth part; and selects a random access channel configuration from the at least one random access channel configuration; and a transmitter that transmits a random access channel preamble in the first uplink bandwidth part according to the random access channel configuration; wherein the receiver receives a physical downlink control channel from a common search space in a downlink bandwidth part, and the common search space in the downlink bandwidth part is associated with the random access channel configuration.

In certain embodiments, the physical downlink control channel comprises a downlink control information format with cyclic redundancy check scrambled by one of a random access-radio network temporary identifier, a temporary cell-radio network temporary identifier, or a cell-radio network temporary identifier.

In some embodiments, the first bandwidth part configuration does not comprise the at least one random access channel configuration, the second bandwidth part configuration comprises the at least one random access channel configuration, the first and second uplink bandwidth parts at least partially overlap in frequency, and the at least one random access channel configuration is within an overlapped bandwidth of the first and second uplink bandwidth parts.

In one embodiment, the transmitter transmits message 3 in the overlapped bandwidth of the first and second uplink bandwidth parts.

In certain embodiments, the random access channel configuration is configured via the first bandwidth part configuration, the first bandwidth part configuration comprises a first random access channel configuration from the at least one random access channel configuration and the second bandwidth part configuration comprises a second random access channel configuration from the at least one random access channel configuration.

In some embodiments, the random access channel configuration is configured via a bandwidth part configuration of an uplink bandwidth part with a numerology suitable for a logical channel triggering a scheduling request.

In various embodiments, the receiver receives an indication of association between a given random access channel configuration in an uplink carrier of the cell and a given random access channel common search space of a downlink carrier of the cell, wherein the random access channel common search space is a common search space for reception of a random access response message and a contention resolution message.

In one embodiment, the given random access channel configuration has the given random access channel common search space within a bandwidth of a current active downlink bandwidth part, and receiving the physical downlink control channel from the common search space in the downlink bandwidth part comprises receiving the physical downlink control channel from the common search space within the bandwidth of the current active downlink bandwidth part.

In certain embodiments, the processor: selects a random access channel common search space from one or more random access channel common search space within a bandwidth of an active downlink bandwidth part; determines a second random access channel configuration associated with the random access channel common search space; and switches to a third uplink bandwidth part, wherein the third uplink bandwidth part is configured with the second random access channel configuration; and the transmitter transmits a second random access channel preamble in the third uplink bandwidth part according to the second random access channel configuration.

In some embodiments, the random access channel common search space is configured via a bandwidth part configuration of the active downlink bandwidth part.

In various embodiments, the random access channel common search space is configured with a numerology the same as a numerology of the active downlink bandwidth part.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving a first bandwidth part configuration for a first downlink bandwidth part and a second bandwidth part configuration for a second downlink bandwidth part;
receiving an indication to receive downlink signals and channels in the first downlink bandwidth part;
identifying a control resource set and a corresponding search space for a type of physical downlink control channel common search space within a bandwidth of the first downlink bandwidth part from the second bandwidth part configuration;
monitoring physical downlink control channel candidates on the control resource set according to the corresponding search space in the first downlink bandwidth part; and
receiving a physical downlink control channel on the control resource set according to the corresponding search space in the first downlink bandwidth part, wherein the physical downlink control channel includes downlink control information associated with the type of physical downlink control channel common search space.

2. The method of claim 1, further comprising receiving a physical downlink shared channel carrying a common control message according to the downlink control information of the physical downlink control channel.

3. The method of claim 2, wherein the common control message comprises a broadcast system information message, a paging message, a random access response message, a contention resolution message, or some combination thereof.

4. The method of claim 1, wherein the first downlink bandwidth part is an active downlink bandwidth part and the second downlink bandwidth part is an initial downlink bandwidth part.

5. The method of claim 1, further comprising receiving, on the physical downlink control channel, downlink control information associated with a user equipment-specific search space indicated in the first bandwidth part configuration.

6. The method of claim 1, wherein the first bandwidth part configuration does not include information of the control resource set, the first and second downlink bandwidth parts at least partially overlap in frequency, and the control resource set is within an overlapped bandwidth of the first and second downlink bandwidth parts.

7. The method of claim 6, further comprising simultaneously receiving the physical downlink control channel on the control resource set according to the corresponding search space and at least one of the downlink signals and channels of the first downlink bandwidth part.

8. The method of claim 6, wherein the first and second downlink bandwidth parts have a same numerology, and the numerology comprises at least a subcarrier spacing and a cyclic prefix length.

9. The method of claim 1, further comprising:
   identifying a second control resource set and a corresponding second search space for the type of physical downlink control channel common search space from the first bandwidth part configuration; and
   selecting the second control resource set and the second search space to receive a second physical downlink control channel including the downlink control information associated with the type of physical downlink control channel common search space;
   wherein the first bandwidth part configuration includes indications of the second control resource set and the corresponding second search space and the second bandwidth part configuration includes indications of the control resource set and the corresponding search space for the type of physical downlink control channel common search space.

10. The method of claim 9, further comprising prioritizing reception of the physical downlink control channel associated with the type of physical downlink control channel common search space over monitoring a user equipment-specific control resource set and reception of a user equipment-specific physical downlink shared channel.

11. The method of claim 1, further comprising identifying association between a given random access channel resource of an uplink bandwidth part in an uplink carrier of a cell and a given control resource set and a corresponding search space of a downlink bandwidth part of a downlink carrier of the cell for the type of physical downlink control channel common search space based on a bandwidth part identity, wherein the type of physical downlink control channel common search space is a common search space for reception of a random access response message and a contention resolution message.

12. The method of claim 11, further comprising:
   receiving a third bandwidth part configuration for a first uplink bandwidth part and a fourth bandwidth part configuration for a second uplink bandwidth part, wherein the first uplink bandwidth part and the first downlink bandwidth part have a first bandwidth part identity, and the second uplink bandwidth part and the second downlink bandwidth part have a second bandwidth part identity;
   receiving an indication to transmit uplink signals and channels in the first uplink bandwidth part;
   determining whether the first uplink bandwidth part includes a random access channel resource according to the third bandwidth part configuration;
   switching to the second uplink bandwidth part in response to initiation of a random access procedure and the first uplink bandwidth part not including the random access channel resource, wherein the second uplink bandwidth part includes a random access channel resource according to the fourth bandwidth part configuration; and
   switching to the second downlink bandwidth part based on the association between the random access channel resource in the second uplink bandwidth part and a control resource set and a corresponding search space for the type of physical downlink control channel common search space in the second downlink bandwidth part.

13. The method of claim 12, wherein the first uplink bandwidth part is an active uplink bandwidth part and the second uplink bandwidth part is an initial uplink bandwidth part.

14. The method of claim 1, further comprising receiving a downlink control information format or a dedicated radio resource control signaling that orders a user equipment to perform contention-free or contention-based random access, wherein the downlink control information format or the dedicated radio resource control signaling includes an indication of a random access channel configuration for which the user equipment transmits at least one physical random access channel preamble.

15. An apparatus comprising:
   a receiver that:
      receives a first bandwidth part configuration for a first downlink bandwidth part and a second bandwidth part configuration for a second downlink bandwidth part; and
      receives an indication to receive downlink signals and channels in the first downlink bandwidth part; and
   a processor that:
      identifies a control resource set and a corresponding search space for a type of physical downlink control channel common search space within a bandwidth of the first downlink bandwidth part from the second bandwidth part configuration; and
      monitors physical downlink control channel candidates on the control resource set according to the corresponding search space in the first downlink bandwidth part;
   wherein the receiver receives a physical downlink control channel on the control resource set according to the corresponding search space in the first downlink bandwidth part, and the physical downlink control channel includes downlink control information associated with the type of physical downlink control channel common search space.

16. The apparatus of claim 15, wherein the receiver receives a physical downlink shared channel carrying a common control message according to the downlink control information of the physical downlink control channel.

17. The apparatus of claim 15, wherein the first downlink bandwidth part is an active downlink bandwidth part and the second downlink bandwidth part is an initial downlink bandwidth part.

18. The apparatus of claim 15, wherein the receiver receives, on the physical downlink control channel, downlink control information associated with a user equipment-specific search space indicated in the first bandwidth part configuration.

19. The apparatus of claim 15, wherein the first bandwidth part configuration does not include information of the control resource set, the first and second downlink bandwidth parts at least partially overlap in frequency, and the control resource set is within an overlapped bandwidth of the first and second downlink bandwidth parts.

20. The apparatus of claim 19, wherein the first and second downlink bandwidth parts have a same numerology, and the numerology comprises at least a subcarrier spacing and a cyclic prefix length.

\* \* \* \* \*